United States Patent
Inagaki et al.

(10) Patent No.: US 9,774,032 B2
(45) Date of Patent: Sep. 26, 2017

(54) ACTIVE SUBSTANCE

(71) Applicant: Kabushiki Kaisha Toshiba, Minato-ku (JP)

(72) Inventors: Hiroki Inagaki, Yokohama (JP); Yasuhiro Harada, Isehara (JP); Yorikazu Yoshida, Yokohama (JP); Kazuki Ise, Fuchu (JP); Norio Takami, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 399 days.

(21) Appl. No.: 14/492,558

(22) Filed: Sep. 22, 2014

(65) Prior Publication Data

US 2015/0086839 A1  Mar. 26, 2015

(30) Foreign Application Priority Data

Sep. 24, 2013 (JP) .................. 2013-197269
Aug. 29, 2014 (JP) .................. 2014-176444

(51) Int. Cl.
| | |
|---|---|
| *H01M 4/36* | (2006.01) |
| *H01M 4/485* | (2010.01) |
| *C01G 33/00* | (2006.01) |
| H01M 10/052 | (2010.01) |
| H01M 4/62 | (2006.01) |

(52) U.S. Cl.
CPC ............ *H01M 4/366* (2013.01); *C01G 33/00* (2013.01); *C01G 33/006* (2013.01); *H01M 4/485* (2013.01); *C01P 2002/52* (2013.01); *C01P 2002/72* (2013.01); *C01P 2002/76* (2013.01); *C01P 2002/77* (2013.01); *C01P 2004/03* (2013.01); *C01P 2004/61* (2013.01); *C01P 2006/12* (2013.01); *C01P 2006/21* (2013.01); *C01P 2006/40* (2013.01); *H01M 4/625* (2013.01); *H01M 10/052* (2013.01); *H01M 2220/20* (2013.01); *Y02E 60/122* (2013.01); *Y02P 70/54* (2015.11)

(58) Field of Classification Search
CPC ...... H01M 4/366; H01M 4/485; H01M 4/625; H01M 10/052; H01M 2220/20; Y02E 60/122; C01G 33/006; C01P 2004/61; Y02P 70/54

See application file for complete search history.

(56) References Cited

U.S. PATENT DOCUMENTS

| | | |
|---|---|---|
| 2011/0195308 A1 | 8/2011 | Lee et al. |
| 2012/0009449 A1 | 1/2012 | Inagaki et al. |
| 2012/0052401 A1 | 3/2012 | Goodenough et al. |
| 2012/0107692 A1 | 5/2012 | Harada et al. |
| 2012/0244442 A1 | 9/2012 | Harada et al. |

FOREIGN PATENT DOCUMENTS

| | | |
|---|---|---|
| CN | 101047237 A | 10/2007 |
| CN | 102148375 A | 8/2011 |
| CN | 102544466 A | 7/2012 |
| CN | 103081187 A | 5/2013 |
| JP | 2004-220897 A | 8/2004 |
| JP | 2010-287496 A | 12/2010 |
| JP | 2012-18778 A | 1/2012 |
| JP | 2013-157335 A | 8/2013 |
| JP | 2013-535787 A | 9/2013 |

OTHER PUBLICATIONS

Combined Chinese Office Action and Search Report dated May 5, 2016 in Patent Application No. 201410465397.1 (with partial English language translation and English language translation of categories of cited documents).
C. M. Reich, et al., "Niobia Based Rutile Materials as SOFC Anodes", Fuel Cells, vol. 1, No. 3-4, (2001), pp. 249-255.
Combined Chinese Office Action and Search Report dated Feb. 15, 2017 in Patent Application No. 201410465397.1 (with English language translation of categories of cited documents).
Office Action dated Feb. 7, 2017 in Japanese Patent Application No. 2014-176444.

*Primary Examiner* — Laura Weiner
(74) *Attorney, Agent, or Firm* — Oblon, McClelland, Maier & Neustadt, L.L.P.

(57) ABSTRACT

According to one embodiment, there is provided an active substance. The active substance includes secondary particles and a carbon material phase formed on at least a part of a surface of each of the secondary particles. Each of the secondary particles is constructed by aggregated primary particles of an active material. The primary particles of the active material includes a niobium composite oxide represented by $Li_xM_{(1-y)}Nb_yNb_2O_{(7+\delta)}$, wherein M is at least one selected from the group consisting of Ti and Zr, and x, y, and $\delta$ respectively satisfy $0 \le x \le 6$, $0 \le y \le 1$, and $-1 \le \delta \le 1$. The secondary particles have a compression fracture strength of 10 MPa or more.

14 Claims, 6 Drawing Sheets

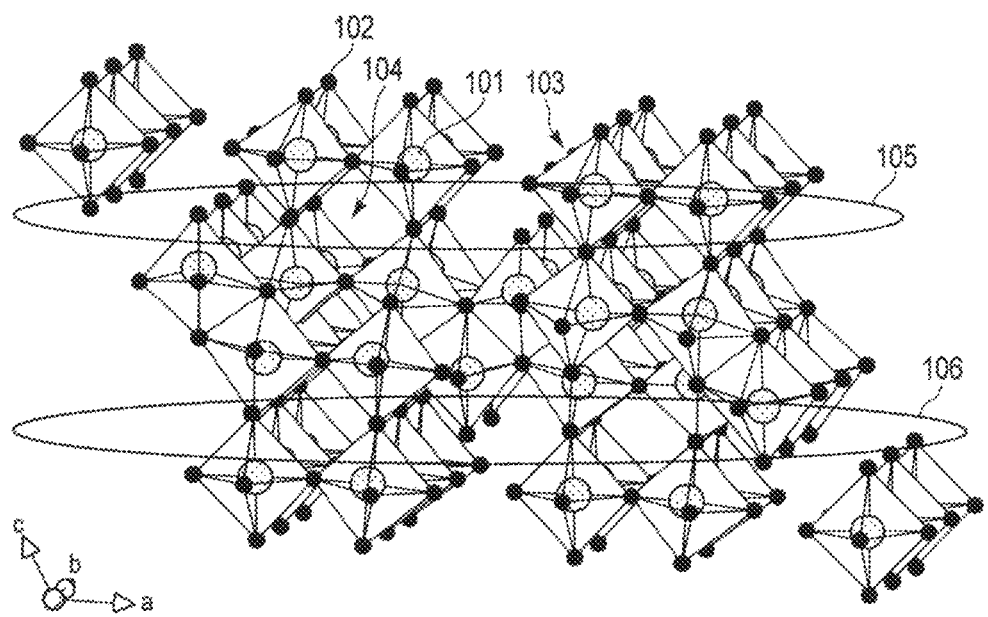
F I G. 1
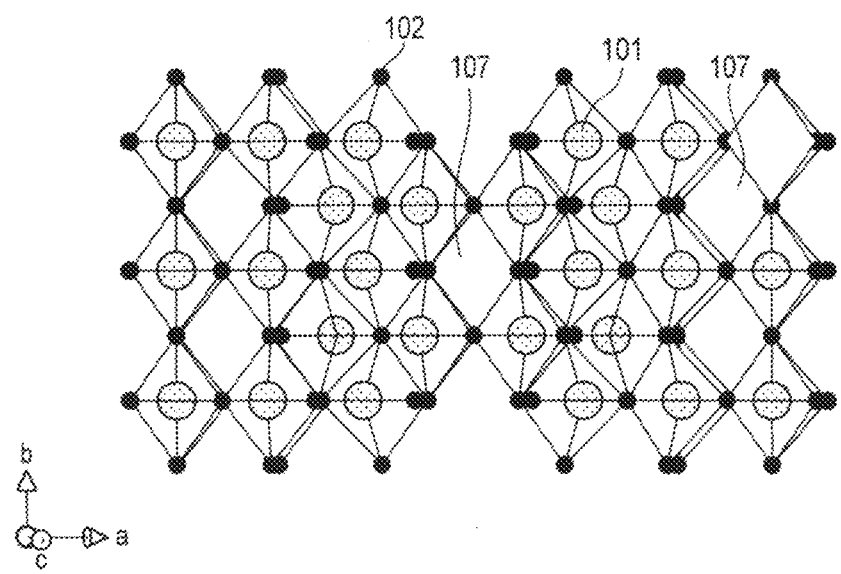
F I G. 2

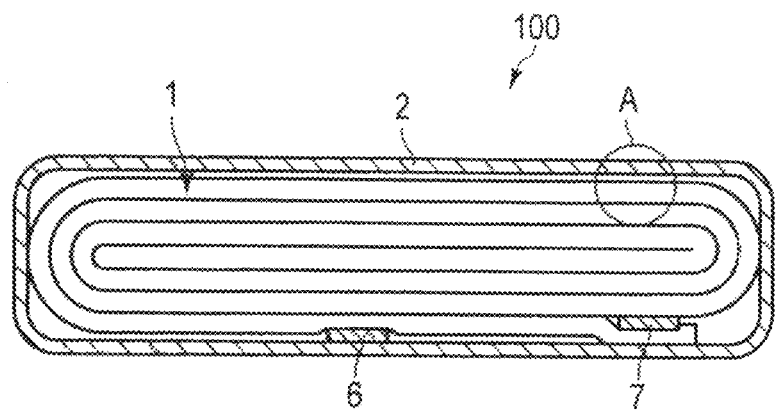
F I G. 5
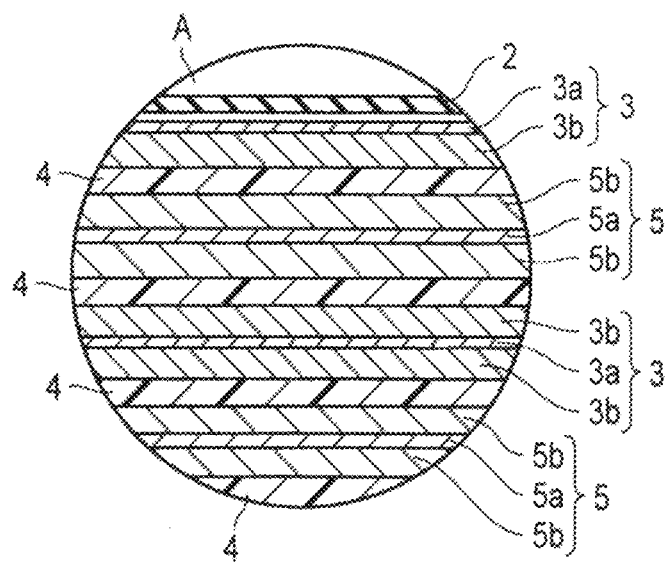
F I G. 6

ACTIVE SUBSTANCE

CROSS-REFERENCE TO RELATED APPLICATIONS

This application is based upon and claims the benefit of priority from the Japanese Patent Applications No. 2013-197269, filed Sep. 24, 2013; and No. 2014-176444, filed Aug. 29, 2014, the entire contents of all of which are incorporated herein by reference.

FIELD

Embodiments described herein relate generally to an active substance, a manufacturing process of an active substance, a nonaqueous electrolyte battery, a battery pack and an automobile.

BACKGROUND

Recently, a nonaqueous electrolyte battery such as a lithium-ion secondary battery has been developed as a battery having a high energy density. The nonaqueous electrolyte battery is expected to be used as a power source for vehicles such as hybrid vehicles or electric cars or a large-sized power source for electricity storage. Furthermore, the nonaqueous electrolyte battery is also expected to be used as an uninterruptible power supply for a mobile phone base station. Therefore, the nonaqueous electrolyte battery is desired to have other performances such as rapid charge and discharge performances and long-term reliability. A nonaqueous electrolyte battery enabling rapid charge and discharge not only remarkably shortens the charging time but also makes it possible to improve performances related to the motive force of a hybrid vehicle and to efficiently recover the regenerative energy thereof.

In order to enable rapid charge and discharge, it is necessary for electrons and lithium ions to be able to migrate rapidly between the positive electrode and the negative electrode. When a battery using a carbon based material in the negative electrode undergoes repeated rapid charge and discharge, dendrite precipitation of metal lithium occurs on the electrode. Dendrites cause internal short circuits, which can lead to heat generation and fires.

In light of this, a battery using a metal composite oxide as a negative electrode active material in place of a carbonaceous material has been developed. Particularly, in a battery using titanium oxide as the negative electrode active material, rapid charge and discharge can be performed stably. Such a battery also has a longer life than those using a carbonaceous material.

However, titanium oxide has a higher (nobler) potential relative to metal lithium than that of the carbonaceous material. Further, titanium oxide has a lower capacity per weight. Thus, a battery formed by using the titanium oxide has a problem such that the energy density is low.

For example, the potential of the electrode using titanium oxide is about 1.5 V based on metal lithium and is higher (i.e., nobler) than that of the negative electrode using the carbonaceous material. The potential of titanium oxide is due to the redox reaction between $Ti^{3+}$ and $Ti^{4+}$ when lithium is electrochemically absorbed and released. Therefore, it is limited electrochemically. Further, there is the fact that rapid absorption and release of lithium ion can be stably performed at an electrode potential as high as about 1.5 V. Therefore, it is substantially difficult to drop the potential of the electrode to improve energy density.

As to the capacity of the battery per unit weight, the theoretical capacity of a lithium-titanium composite oxide such as $Li_4Ti_5O_{12}$ is about 175 mAh/g. On the other hand, the theoretical capacity of a general graphite-based electrode material is 372 mAh/g. Therefore, the capacity density of titanium oxide is significantly lower than that of the carbon-based negative electrode. This is due to a reduction in substantial capacity because there are only a small number of lithium-absorption sites in the crystal structure and lithium tends to be stabilized in the structure.

In view of such circumstances, a new electrode material containing Ti and Nb has been examined. Particularly, a composite oxide represented by $TiNb_2O_7$ has been focused on as it enables a high capacity to be obtained.

BRIEF DESCRIPTION OF THE DRAWINGS

FIG. 1 is a schematic view showing the crystal structure of a titanium niobium composite oxide ($TiNb_2O_7$);

FIG. 2 is a schematic view of the crystal structure of FIG. 1 as viewed from another direction;

FIG. 5 is a sectional view showing a flat type nonaqueous electrolyte battery of an example according to a third embodiment;

FIG. 6 is an enlarged sectional view of a region A of FIG. 5;

DETAILED DESCRIPTION

Figure 3:
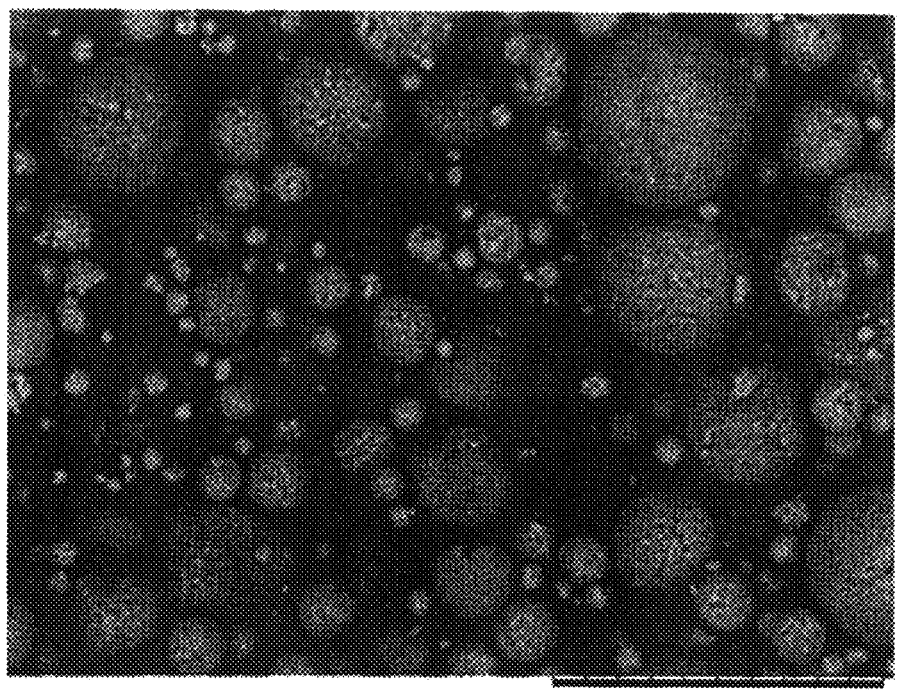
FIG. 3 is a SEM image of an example of an active substance according to a first embodiment.

In general, according to one embodiment, there is provided an active substance. The active substance includes secondary particles and a carbon material phase formed on at least a part of a surface of each of the secondary particles. Each of the secondary particles is constructed by aggregated primary particles of an active material. The primary particles of the active material includes a niobium composite oxide represented by $Li_xM_{(1-y)}Nb_yNb_2O_{(7+\delta)}$, wherein M is at least one selected from the group consisting of Ti and Zr, and x, y, and $\delta$ respectively satisfy $0 \leq x \leq 6$, $0 \leq y \leq 1$, and $-1 \leq \delta \leq 1$. The secondary particles have a compression fracture strength of 10 MPa or more.

The embodiments will be explained below with reference to the drawings. In this case, the structures common to all embodiments are represented by the same symbols and duplicated explanations will be omitted. Also, each drawing is a schematic view for explaining the embodiments and for promoting the understanding of the embodiments. Though there are parts different from an actual device in shape, dimension and ratio, these structural designs may be appropriately changed taking the following explanations and known technologies into consideration.

(First Embodiment)

According to a first embodiment, there is provided an active substance. The active substance includes secondary particles and a carbon material phase formed on at least a part of a surface of each of the secondary particles. Each of the secondary particle is constructed by aggregated primary particles of an active material. The primary particles of the active material includes a niobium composite oxide represented by $Li_xM_{(1-y)}Nb_yNb_2O_{(7+\delta)}$, wherein M is at least one selected from the group consisting of Ti and Zr, and x, y, and $\delta$ respectively satisfy $0 \le x \le 6$, $0 \le y \le 1$, and $-1 \le \delta \le 1$. The secondary particles have a compression fracture strength of 10 MPa or more.

The niobium composite oxide represented by the general formula $Li_xM_{(1-y)}Nb_yNb_2O_{(7+\delta)}$ can provide a battery which enables rapid charge and discharge to be stably repeated without impairing a rate performance and an energy density, due to the reason described below.

An example of the crystal structure of the niobium composite oxide will be described with reference to FIGS. 1 and 2.

FIG. 1 is a schematic view showing the crystal structure of a titanium niobium composite oxide ($TiNb_2O_7$). FIG. 2 is a schematic view of the crystal structure of FIG. 1 as viewed from another direction.

As shown in FIG. 1, the crystal structure of a titanium niobium composite oxide ($TiNb_2O_7$) which is an example of a monoclinic type niobium composite oxide contains a metal ion 101 and an oxide ion 102 which constitute a skeleton structure portion 103. As the metal ion 101, a Nb ion and a Ti ion are arranged at random in a ratio (Nb:Ti) of 2:1. The skeleton structure portions 103 are alternately arranged three-dimensionally, allowing the presence of void portions 104 therebetween. This void portion 104 constitutes a host of lithium ions.

In FIG. 1, a region 105 and a region 106 are portions having two-dimensional channels in the [100] direction and direction respectively. As shown in FIG. 2, in each region, a void portion 107 exists in the [001] direction in the crystal structure of monoclinic type $TiNb_2O_7$. This void portion 107 has a tunnel structure advantageous in the conduction of lithium ions and constitutes a conductive path extending in the [001] direction and connecting the region 105 with the region 106. The presence of this conductive path enables lithium ions to move between the regions 105 and 106.

Thus, $TiNb_2O_7$ with a monoclinic crystal structure has an equivalently large space into which lithium ions are absorbed and has a structural stability. Further, $TiNb_2O_7$ with a monoclinic crystal structure has two-dimensional channels enabling rapid diffusion of lithium ions and conduction paths connecting these channels in the direction [001]. Then, the lithium ions are absorbed into and released from the absorption spaces effectively, and the absorption and release spaces for lithium ions are effectually increased. Thus, $TiNb_2O_7$ with a monoclinic crystal structure can provide a high capacity and high rate performance.

When lithium ions are absorbed in the void 104, the metal ion 101 constituting the skeleton is reduced to a trivalent one, thereby maintaining electroneutrality of the crystal structure of $TiNb_2O_7$. In a niobium titanium composite oxide represented by $TiNb_2O_7$, not only is a Ti ion reduced from tetravalent to trivalent but also an Nb ion is reduced from pentavalent to trivalent. Because of this, the number of reduced valences per active material weight is large. Therefore, the electroneutrality of the crystal can be maintained, even if many lithium ions are absorbed. Therefore, the energy density of the oxide is higher than that of a compound only containing a tetravalent cation, such as titanium oxide. The theoretical capacity of the niobium titanium composite oxide represented by $TiNb_2O_7$ is about 387 mAh/g and is more than twice the value of titanium oxide having a spinel structure.

The niobium titanium composite oxide represented by $TiNb_2O_7$ has a lithium absorption potential of about 1.5 V (vs. $Li/Li^+$). Therefore, a battery which is excellent in rate performance and is capable of stably repeating rapid charge and discharge can be provided by using the active material having the crystal structure represented by $TiNb_2O_7$.

Lithium Li in the general formula $Li_xM_{(1-y)}Nb_yNb_2O_{(7+\delta)}$ can be absorbed when the niobium composite oxide is used as the active material in a nonaqueous electrolyte battery. That is, the niobium composite oxide of the active substance according to the first embodiment contained in the nonaqueous electrolyte battery subjected to charge or discharge may contain lithium. On the other hand, the niobium composite oxide of the active substance according to the first embodiment contained in the nonaqueous electrolyte battery before being incorporated into the nonaqueous electrolyte battery or before being subjected to charge or discharge may not contain lithium. Alternatively, the niobium composite oxide may contain lithium by using a compound containing lithium such as lithium carbonate as a starting material to synthesize the niobium composite oxide.

In the niobium composite oxide, a part of sites of a metal element M (Ti and/or Zr) in the crystal structure may be substituted by an element Nb. A subscript y in the general formula $Li_xM_{(1-y)}Nb_yNb_2O_{(7+\delta)}$ means a portion substituted by the element Nb in the sites of the metal element M in the crystal structure. Since the number of valences of the sites of the metal element of the niobium composite oxide changes according to the substitutional state of the metal element M by the element Nb, the number of oxygen atoms in the general formula may be 6 to 8.

The niobium composite oxide represented by the general formula $Li_xM_{(1-y)}Nb_yNb_2O_{(7+\delta)}$ preferably has the crystal structure of the monoclinic oxide. Furthermore, the niobium composite oxide more preferably has space group C2/m or P12/m1 symmetry. The niobium composite oxide may have a crystal structure which has an atomic coordination as described in Journal of Solid-State Chemistry 53, pp. 144-147 (1984).

The niobium composite oxide represented by the general formula $Li_xM_{(1-y)}Nb_yNb_2O_{(7+\delta)}$ has been found to have low lithium ion conductivity and low electron conductivity. When such material is used for the active material for the battery, the battery has a poor large-current performance and a short life. In order to resolve the problem, for example, it is effective to shorten the diffusion paths of the lithium ion by microparticulation, and to cover the surface of the material with carbon, which has high electroconductivity.

However, the microparticulation causes a low binding force between particles covered with carbon. This requires a large quantity of binder in order to bind these particles. Because of this, the electrical capacity of an electrode containing these particles as the active substance is decreased. The surfaces of active material fine particles are reduced by a heating treatment when the particles are covered with carbon, which generates a difference phase. This remarkably decreases the electrical capacity.

In view of this problem, the present inventors have conducted earnest studies and have discovered an active substance according to the first embodiment.

Since the active substance according to the first embodiment includes the secondary particles each of which is constructed by the aggregated primary particles of the niobium composite oxide described above, and the secondary particles have a compression fracture strength of 10 MPa or more, a binding force between the primary particles is high. Therefore, the necessary quantity of the binder can be decreased by using the active substance.

When the active substance is used in the production of the battery, it may be necessary to disperse the active substance in a solvent. When the compression fracture strength of the active substance is low, it is found that the secondary particles collapse during dispersion, which decreases the binding performance of the electrode, which greatly decreases the electron conductivity. Since the compression fracture strength of the secondary particles is 10 MPa or more in the active substance according to the first embodiment, the active substance can considerably suppress the collapse of the particles during dispersion. Thus, an electron conductive path is less likely to collapse. Therefore, a good charge-and-discharge life performance can be achieved. On the other hand, when the compression fracture strength is less than 10 MPa, the particles collapse in the process of producing an electrode, which decreases the binding performance of the electrode. As a result, the active material and the current collector peel away from each other, which significantly reduces the cycle life. The compression fracture strength is preferably 30 MPa or more. The upper limit of the compression fracture strength is preferably 200 MPa or less. When the compression fracture strength is 200 MPa or less, the electrode density is easily made high so that the volume energy density can be increased.

Since the active substance according to the first embodiment includes the carbon material phase formed on at least a part of the surface of the secondary particle, the active substance can exhibit excellent conductivity.

Because of the above, the active substance according to the first embodiment can achieve a nonaqueous electrolyte battery having an improved cycle performance without impairing a capacity and a rate performance.

The active substance according to the first embodiment can be used in both the negative electrode and the positive electrode of the nonaqueous electrolyte battery. Even if the active substance is applied to any of the negative electrode and the positive electrode, the nonaqueous electrolyte battery can maintain a high capacity, and achieve an excellent high-current performance and cycle performance.

When the active substance according to the first embodiment is used for a positive electrode, metallic lithium, a lithium alloy, or a carbonaceous material such as graphite or coke may be used as the active material for a negative electrode as the counter electrode thereof.

When the active substance according to the first embodiment is used as a negative electrode active material in the negative electrode, the active substance may be used alone or together with a different active material. The different active material may be, for example, a lithium-titanium composite oxide having a spinel type structure (such as $Li_4Ti_5O_{12}$), a titanium composite oxide having an anatase structure, a rutile structure, or a monoclinic β structure (such as a-$TiO_2$, r-$TiO_2$, or $TiO_2$(B)), or an iron composite sulfide (such as FeS, or $FeS_2$).

Similarly, when the active substance for the electrode according to the first embodiment is used as a positive electrode active material in the positive electrode, the active substance may be used alone or together with a different active material. The different active material may be, for example, a lithium-titanium composite oxide having a spinel type structure (such as $Li_4Ti_5O_{12}$), a titanium composite oxide having an anatase structure, a rutile structure, or a monoclinic β structure (such as a-$TiO_2$, r-$TiO_2$ or $TiO_2$(B)), or an iron composite sulfide (such as FeS, or $FeS_2$).

The carbon content of the active substance according to the first embodiment is preferably in a range of 0.1% by mass to 10% by mass based on the mass of the active substance. When the carbon content is in such range, a more sufficient amount of carbonate ions can be provided while the capacity is sufficiently secured. Thereby, the high-current performance can be improved. More preferably, the carbon content is 1% by mass to 3% by mass based on the mass of the active substance. The amount of carbon can be quantified by a high frequency heating-infrared absorption method, for example.

In the active substance according to the first embodiment, a carbon concentration in a central part is preferably lower than a carbon concentration in a surrounding part. For example, such a case means that each of the primary particles of the active material is not covered with carbon. Since the reduction of the surface of each of the primary particles can be suppressed in this case, the decrease in capacity can be suppressed. The presence state of carbon can be determined by subjecting a cross-section of the active material to line analysis or carbon mapping or the like using, for example, an electron probe microanalyzer (SPMA).

The secondary particles preferably have an average particle diameter of 1 µm to 100 µm. If the average particle diameter of the secondary particles is in this range, the particles are easily handled during industrial production thereof. The mass and the thickness of the coated film for fabricating the electrode can be made uniform, and further the decrease in the surface smoothness of the electrode can be prevented. The average particle diameter of the secondary particles is more preferably 3 µm to 30 µm.

The active substance containing the secondary particles can be confirmed by observation with a scanning electron microscope (SEM).

Figure 4:
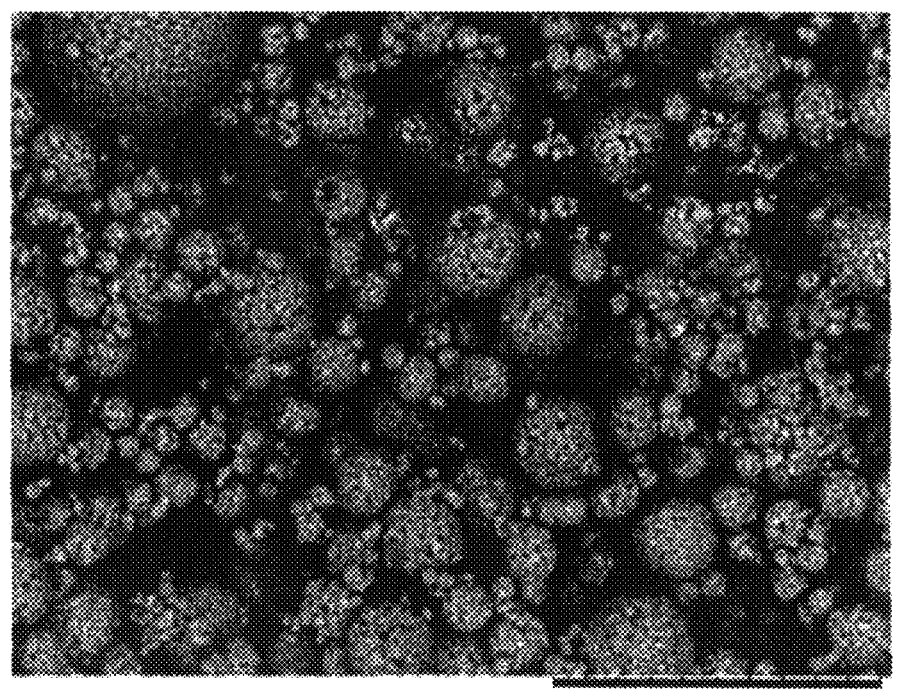
FIG. 4 is a SEM image of an active substance taken out from an electrode produced by using the active substance shown in FIG. 3.

FIG. 3 is a SEM image of an example of an active substance according to a first embodiment. FIG. 4 is a SEM image of an active substance taken out from an electrode produced by using the active substance shown in FIG. 3.

In the view of FIG. 3, there are many particles having different sizes to each other. However, most of the particles are secondary particles. On the other hand, in the view of FIG. 4, there are more particles having small size, compared with the view of FIG. 3. This is because, for example, in the pressing process of the fabrication of the electrode, a part of the secondary particles was collapsed. However, as in the example shown in FIG. 4, the active substance according to the first embodiment, which is incorporated in the electrode, includes secondary particles of an active material.

The primary particles contained in the secondary particles have an average primary particle diameter of 1 nm to 10 µm. If the average primary particle diameter is in this range, the particles are easily handled in industrial production thereof, and the diffusion of lithium ions can be accelerated in the solid of the niobium composite oxide. The average primary particle diameter is more preferably 10 nm to 1 µm.

The primary particles are preferably isotropic particles. Herein, the isotropic particle means particle having an aspect ratio of 3 or less. The isotropic form of the primary particles can be confirmed by observation with a scanning electron microscope (SEM).

Each of the secondary particles preferably has a specific surface area of 5 $m^2$/g to 50 $m^2$/g, the area being measured by the BET method. When the specific surface area is 5 $m^2$/g or more, adsorbing and releasing sites for lithium ions can be sufficiently secured. When the specific surface area is 50 m²/g or less, the particle is easily handled in industrial production thereof.

In the active substance according to the first embodiment, the niobium composite oxide preferably contains at least one element selected from phosphorus and boron. Phosphorus and/or boron may be solid-solved in the niobium composite oxide, or may be deposited in a grain boundary. The content of the element in the active substance containing such element is preferably in a range of 0.01% by mass to 3% by mass. When the content of at least one element selected from phosphorus and boron is 0.01% by mass or more, a sufficient compression fracture strength can be obtained. When the content is 3% by mass or less, the generation of a difference phase of the niobium composite oxide, which may cause a decrease in the electrical capacity and the charge-and-discharge cycle performance, can be prevented.

The content of the element is more preferably 0.03% by mass to 1% by mass. When the content is in a range of 0.03% by mass to 1% by mass, the compression fracture strength of the secondary particle can be more effectively made high.

Phosphorus and boron may be added alone or in combination. When two or more elements are added, the total content of these elements is preferably 0.01% by mass to 3% by mass.

The total content of at least one element selected from phosphorus and boron may be measured by ICP emission spectroscopy.

The active substance according to the first embodiment may further unavoidably contain 1000 ppm by mass or less of production impurities other than such elements.

The active substance according to the first embodiment described above can be produced by a method for producing an active substance according to a second embodiment described below, for example.

Next, a method for measuring the compression fracture strength of the secondary particle of the active substance according to the first embodiment, a method for measuring the carbon content, a method for measuring the average particle diameter of the secondary particles, a method for identifying the average particle diameter of the primary particles, a method for measuring the specific surface area, and a method for measuring the content of the element by the ICP emission spectroscopy will be described.

The active substance according to the first embodiment can be taken out as follows, for example, when the active substance is incorporated into the battery. First, the battery is set to a discharged state. For example, the battery is discharged down to a rated ending voltage at a current of 0.1 C at 25° C., and thereby the battery can be set to a discharged state. Then, the discharged battery is dismantled to take out an electrode (for example, a negative electrode). The taken-out electrode is washed with, for example, methylethyl carbonate. The washed electrode is put into water to inactivate the electrode layer in the water. The active substance can be extracted from the inactivated electrode by using a centrifuge or the like.

The extraction is carried out by washing the electrode with N-methyl-2-pyrrolidone or the like in the case of using polyvinylidene fluoride as a binder to remove a binder component. Then a conductive agent is removed by using a sieve having an appropriate mesh. When these components remain in a slight amount, the components may be removed by a heat treatment (for example, a treatment at 250° C. for 30 minutes) in the atmosphere.

(Measurement of the Compression Fracture Strength)

The compression fracture strength (St [MPa]) is measured by means of a device described below, and is calculated in accordance with Hiramatsu's formula ("Journal of the Mining and Metallurgical Institute of Japan" vol. 81, No. 932, December 1965, 1024-1030) as the following formula (1):
Measuring device: Micro Compression Tester, MCT-W, manufactured by Shimadzu Corp.
<Test Conditions>
Test indenter: FLAT 50
Measuring mode: Compression test
Test force: 20.00 [mN]
Load velocity: 0.892405 [mN]/sec
Calculation formula:

$$St = 2.8P/\pi d^2 \qquad \text{(formula (1))}$$

P: test force [N], and d: particle diameter (mm).

In the present embodiment, subjects to be measured for the compression fracture strength are selected as followed, the measurement is performed, and then the average of the measured strength is defined as the compression fracture strength of the secondary particles.

First, the active substance is taken form the battery as the procedure described above. At the time, it is preferably that the electrode is put into the solvent, which can dissolve the binder included in the electrode, and the solvent is subjected to the ultrasonic wave. This is because the electrode layer can be easily removed from the current collector and the carbon-material phase, which is bound by with the binder, as the conductive aid can be separated from the active material particles. And then, the active material particles recovered is observed by SEM, and it is confirmed that the secondary particles included in the electrode as FIG. 4 can be observed. Note that, if there are no secondary particles in the active material particles recovered, secondary particles may have been collapsed by the ultrasonic treatment. In this case, the ultrasonic treatment is not done, and the electrode is immersed into the solvent, which can dissolve the binder, and maintained this condition for one day to one week. Thus, the secondary particles can be obtained without the collapse thereof.

Among the secondary particles thus obtained, dense spherical particles, having been confirmed not to having the cracks and collapse by appearance, is selected, and the selected particles are measured for strength. In the case of the selection, ten particles having a size corresponding to D50 in the size distribution of the secondary particles are selected. The average value of the selected ten particles is defined to be the compression fracture strength of the secondary particle.

(Method for Measuring Amount of Carbon)

The content of carbon in the active substance can be measured as follows: for example, the active substance taken out as described above is dried at 150° C. for 12 hours; and the active substance is weighed and put into a container, and is measured by a measuring device (for example, CS-444LS, manufactured by LECO Corporation).

When an electrode contains a different active material, the content of carbon can be measured as follows: the active material taken out from the electrode is subjected to transmission electron microscopy-energy dispersive X-ray spectroscopy (TEM-EDX), and the crystal structure of each particle therein is specified by a selected-area diffraction method. Therefrom, particles having a diffraction pattern belonging to the niobium composite oxide are selected, and then the content of carbon is measured. At this time, when carbon mapping is obtained by EDX, the presence range of carbon can be known.

(Method for Measuring Average Particle Diameter of Secondary Particles)

A method for measuring the average particle diameter of the secondary particles is as follows: a laser diffraction type distribution measuring device (SALD-300, manufactured by Shimadzu Corp.) is used as a measuring device. First, about 0.1 g of a sample, a surfactant, and 1 to 2 mL of distilled water are put into a beaker, and the mixture is sufficiently stirred. Then, the mixture is poured into a stirring water tank to prepare a sample solution herein. The luminous-intensity distribution therefrom is measured at intervals of 2 seconds 64 times by using the sample solution. Then, the particle size distribution data are analyzed.

(Method for Identifying Average Diameter of Primary Particles)

The average primary particle diameter can be identified by observation with a scanning electron microscope (SEM). Ten typical particles are extracted from a typical viewing field. The average of the particle diameters of the 10 particles is calculated and defined as the average primary particle diameter.

(Method for Measuring Specific Surface Area)

The specific surface area can be measured by the following method: a molecule of which the adsorption occupying area is known is made to adsorb to the surface of the powder particle at the temperature of liquid nitrogen; and the specific surface area of the powder particle is calculated from the amount of the molecule adsorbed on it. The method most frequently used for this is the BET method. The BET method involves low-temperature and low-humidity physical adsorption of an inert gas, and is based on the best known theory for calculating the specific surface area. The theory itself is based on extending the Langmuir theory, which involves monolayer adsorption, to multilayer adsorption. The specific surface area calculated in this manner is referred to as the "BET specific surface area".

(Method for Measuring Content of Element by ICP Emission Spectroscopy)

The content of the element can be measured by, for example, inductively coupled plasma (ICP) emission spectroscopy, using the following method: the active substance extracted in the procedure described above is weighed and put into a container, and then melted with an acid or alkali to obtain a measurement solution. The measurement solution may be subjected to ICP emission spectroscopy by means of a measuring device (for example, SPS-1500V, manufactured by SII Nano Technology Inc.) to measure the content of the element in the active substance.

For example, the content of phosphorus and/or boron in the active substance can be measured by the emission analyzing device. On the other hand, when an electrode contains also a different active material, the total content of at least one element selected from phosphorus and boron may be measured as follows: the negative electrode active material taken out from the electrode is subjected to TEM-EDX, and the crystal structure of each particle therein is specified by a selected-area diffraction method. Therefrom, particles having a diffraction pattern belonging to $TiNb_2O_7$ can be selected, and then the total content of at least one element selected from phosphorus and boron can be measured by EDX analysis.

(Wide-angle X-ray Scattering Measurement)

Next, a method for identifying the crystal structure of the active material will be described.

The crystal structure of the active material may be identified by wide-angle X-ray diffraction (X-ray Diffraction: XRD).

The wide-angle X-ray diffraction measurement of the active material is performed as follows. First, a subject sample is ground until the average particle diameter is decreased to about 5 μm. As described above, the average particle diameter may be confirmed by, for example, a laser diffraction method or the like. The ground sample is filled in a 0.2-mm-deep holder portion formed on a glass sample plate. At this time, much care is necessary to fill the holder portion sufficiently with the sample. Special care should be taken to avoid cracking and formation of voids caused by insufficient filling of the sample. Then, a separate glass plate is used to smooth the surface of the sample by sufficiently pressing the separate glass plate against the sample. Much care should be taken to avoid excess or deficiency in the amount of the sample to be filled, thereby preventing any rises and dents in the basic plane of the holder. Then, the glass plate filled with the sample is mounted on the wide-angle X-ray diffractometer to obtain a diffraction pattern by using Cu-Kα rays.

When the orientation of the sample is high, there is the possibility that the position of the peak will shift and the intensity ratio will vary, depending on how the sample is filled. Such a sample is measured after it is made into a pellet form. The pellet may be a green compact having, for example, a diameter of 10 mm and a thickness of 2 mm. The green compact may be produced by applying a pressure of about 250 MPa to the sample for 15 minutes. The obtained pellet is mounted on an X-ray diffractometer to measure the surface of the pellet. The measurement using such a method can avoid differences in measuring result between operators, to thereby improve reproducibility.

When the active material contained in the electrode is measured by wide-angle X-ray diffraction, this can be attained by, for example, the following method.

First, in order to understand the crystal state of the active material, the active material is put into a condition under which lithium ions are completely released from the active material. For example, when the active material is used as, for example, the negative electrode, the battery is put into a completely discharged state. However, lithium ions left unremoved possibly exist in such a discharged state. Next, the battery is dismantled in a glove box filled with argon and washed with an appropriate solvent. As the solvent, it is preferable to use, for example, ethyl methyl carbonate. An electrode part having almost the same area as that of the holder of the wide-angle X-ray diffractometer may be cut from the washed electrode and applied directly to the glass holder for the measurement. At this time, XRD is measured in advance corresponding to the type of metal foil of the electrode current collector in order to know where the peak derived from the current collector appears. The presence or absence of peaks derived from ingredients such as a conductive agent and a binder is known in advance. When the peak of the current collector is overlapped on the peak of the active material, it is desirable to perform measurement after the active material is removed from the current collector. The reason for this is that the overlapped peaks are separated from each other when the intensity of each peak is quantitatively measured. Of course, this operation may be omitted if these peaks are known in advance. Although the electrode may be peeled off physically, it is easily peeled off when an ultrasonic wave is applied to it in a solvent. The measurement of the electrode recovered in this manner enables wide-angle X-ray diffraction measurement of the active material.

The results of wide-angle X-ray diffraction obtained in this manner are analyzed by a Rietveld method. In this Rietveld method, actual measured values can be fitted to all diffraction patterns calculated from a crystal structure model estimated in advance to refine the parameters (lattice constant, atomic coordinate, and occupancy or the like) relating to the crystal structure, and the characteristic of the crystal structure of the active material to be measured can be examined.

The state of the crystal phase can be identified by using the wide-angle X-ray diffraction analysis to thereby determine whether or not the added element M is substituted in the composite oxide to form an element M substituted solid solution. Specifically, the presence or absence of an impurity phase and variation in lattice constant (reflected from the ionic radius of the element M to be added) can be analyzed by the wide-angle X-ray diffraction analysis. However, when the element M is added in a trace amount, it might be impossible to determine the distribution of the element M by these methods. In this case, the state of distribution of the added elements can be known by TEM observation and EPMA measurement. It can be thereby determined whether the added element is uniformly distributed in a solid or segregated.

The active substance according to the first embodiment includes the secondary particles each of which is constructed by the aggregated primary particles of the active material of the niobium composite oxide and has a compression fracture strength of 10 MPa or more; and the carbon material phase formed on at least a part of the surface of each of the secondary particles. Due to this, the active substance according to the first embodiment can achieve the nonaqueous electrolyte battery having a high capacity, and an excellent high-current performance and cycle performance.

(Second Embodiment)

According to a second embodiment, there is provided a method for producing an active substance. The active substance includes a niobium composite oxide represented by $Li_xM_{(1-y)}Nb_yNb_2O_{(7+\delta)}$, wherein M is at least one selected from the group consisting of Ti and Zr, and x, y, and δ respectively satisfy $0 \leq x \leq 6$, $0 \leq y \leq 1$, and $-1 \leq \delta \leq 1$. The method includes: providing a niobium composite oxide according to a solid phase reaction; grinding the niobium composite oxide to provide a ground product; forming the ground product into secondary particles; sintering the secondary particles; arranging a carbon precursor on a surface of each of the sintered secondary particles to form a composite including the secondary particles and the carbon precursor; and carbonizing the carbon precursor.

Hereinafter, a method for producing an active substance according to a second embodiment will be described.

First, for example, as described below, a niobium composite oxide is obtained according to a solid phase reaction. However, a method for obtaining the niobium composite oxide is not limited to the solid phase reaction.

First, starting materials are mixed. Oxides or salts optionally containing Ti, Nb, and Zr are used as the starting materials. When $TiNb_2O_7$ is synthesized, oxides such as titanium dioxide or niobium pentoxide can be used as starting materials. The salts to be used as the starting materials are preferably decomposed at a relatively low temperature to form oxides. Examples of the salts include hydroxide salts, carbonates, and nitrates. Appropriate examples thereof include niobium hydroxide and zirconium hydroxide.

Next, the obtained mixture is ground as uniformly as possible to obtain a mixture. Then, the obtained mixture is sintered. The sintering can be performed at a temperature range of 900 to 1400° C. for a total of 1 to 100 hours.

The method described above makes it possible to obtain a niobium composite oxide represented by the general formula $Li_xM_{(1-y)}Nb_yNb_2O_{(7+\delta)}$.

Note that, as described in the first embodiment, the niobium composite oxide is allowed to have remained lithium ions absorbed by charging a battery to be present as an irreversible capacitance. Alternatively, the niobium composite oxide may be synthesized as a lithium-containing composite oxide by using, as the starting materials, a lithium-containing compound such as lithium carbonate. Therefore, the niobium composite oxide can contain a monoclinic oxide phase represented by the general formula $Li_xM_{(1-y)}Nb_yNb_2O_{(7+\delta)}$.

Next, a niobium composite oxide is ground to obtain a ground product. Herein, the niobium composite oxide obtained as described above is ground into fine particles form by using grinding aids such as water, ethanol, methanol, diethylene glycol, polyethylene glycol, cyclohexane, 2-propanol, and 1-butanol.

Then, the ground product is formed into secondary particles. Herein, a spray drying method is preferably used. Then, the obtained secondary particles are sintered.

The processes can be carried out as follows, for example.

Five g of polyethylene glycol and 150 g of pure water are added to the niobium composite oxide (150 g) obtained by sintering, and grinding and dispersing processing are carried out for 12 hours by ball milling using zirconia beads having a diameter of 5 mmφ, whereby a uniform slurry is prepared. Then, the slurry is sprayed in a heated atmosphere of 180° C. and dried, and a granulated body having an average particle diameter of about 10 μm is obtained. The obtained granulated body is sintered for 3 hours at 900° C. under an air atmosphere, whereby aggregated particles are obtained.

Then, a carbon precursor is arranged on the surface of the sintered aggregated particle to form a composite. Then, the carbon precursor is carbonized. These processes can be carried out as follows, for example.

The sintered aggregated particles are mixed with water-soluble monosaccharides, water-soluble polysaccharides or water-soluble polymer compounds, and the particle surfaces are uniformly coated with organic materials using a drying method such as an evaporation-to-dryness method, a vacuum drying method, a spray drying method, or a freeze drying method, to thereby obtain a composite. Then, the composite is sintered in an inert atmosphere at a sintering temperature of 500° C. to 1000° C. which is the temperature at which organic materials are decomposed to produce carbon.

The sintering temperature depends on the organic materials of a selected carbon source, and is preferably in the range of 700° C. to 800° C. At low temperatures equal to or lower than 500° C., the decomposition of the organic materials is not sufficient, and the amount of conductive carbon is not sufficient, which leads to an increase in the internal resistance of a battery, and results in adverse effect. On the other hand, at high temperatures equal to or higher than 1000° C., the surface of the niobium composite oxide is reduced to thereby generate an impurity phase. As a result, the electrical capacity is decreased.

The method for producing the active substance according to the second embodiment can produce the active substance according to the first embodiment, for example. That is, the method for producing the active substance according to the second embodiment can produce the active substance which can achieve the nonaqueous electrolyte battery having a high capacity, and an excellent high-current performance and cycle performance.

(Third Embodiment)

According to a third embodiment, there is provided a nonaqueous electrolyte battery. The nonaqueous electrolyte battery includes a positive electrode, a negative electrode, and a nonaqueous electrolyte. The negative electrode includes the active substance according to the first embodiment.

The nonaqueous electrolyte battery according to the third embodiment may further include a separator provided between the positive electrode and the negative electrode, a container accommodating the positive electrode, the negative electrode, the separator and the nonaqueous electrolyte, a positive electrode terminal, and a negative electrode terminal. The positive electrode may be spatially apart from the negative electrode in such a manner that the separator is sandwiched between the electrodes. The negative electrode terminal may be electrically connected to the negative electrode. The positive electrode terminal may be electrically connected to the positive electrode.

Hereinafter, the container, the negative electrode, the positive electrode, the nonaqueous electrolyte, the separator, the positive electrode terminal, and the negative electrode terminal will be described in detail.

1) Container

The container may be made of a laminated film having a thickness of 0.5 mm or less, for example. Alternatively, the container may be a metallic vessel having a thickness of 1.0 mm or less, for example. The thickness of the metallic vessel is more preferably 0.5 mm or less.

The shape of the container can be selected from a flat type (thin type), an angular type, a cylinder type, a coin type, and a button type, for example. Examples of the container include, depending on the dimensions of the battery, for example, a container for small-sized batteries to be mounted on portable electronic devices or the like and a container for large-sized batteries to be mounted on two- to four-wheel vehicles or the like.

A multilayer film obtained by sandwiching a metal layer between resin layers is used as the laminated film. The metal layer is preferably an aluminum foil or an aluminum alloy foil in the purpose of weight saving. Polymer materials such as polypropylene (PP), polyethylene (PE), nylon, and polyethylene terephthalate (PET) may be used for the resin layer. The laminated film can be molded into the shape of the container by sealing using thermal fusion bonding.

The metallic vessel is made of aluminum or an aluminum alloy or the like, for example. The aluminum alloy is preferably an alloy containing elements such as magnesium, zinc and silicon. When transition metals such as iron, copper, nickel and chromium are contained in the alloy, the content of these transition metals is preferably 100 ppm by mass or less.

2) Negative Electrode

The negative electrode can include a current collector, and a negative electrode layer formed on one or both surfaces of the current collector.

The current collector is preferably an aluminum foil or an aluminum alloy foil containing elements such as Mg, Ti, Zn, Mn, Fe, Cu, and Si, each of which is electrochemically stable in the potential range higher than 1 V (vs. Li/Li$^+$).

The negative electrode layer can contain a negative electrode active material, a conductive agent, and a binder.

The negative electrode active material can contain the active substance according to the first embodiment. The negative electrode active material may contain a negative electrode active material other than the active substance according to the first embodiment, as described in the first embodiment.

The negative electrode active material preferably has a specific surface area of 0.5 m$^2$/g to 50 m$^2$/g. When the specific surface area is 0.5 m$^2$/g or more, adsorbing and releasing sites for lithium ions can be sufficiently secured. When the specific surface area is 50 m$^2$/g or less, the negative electrode active material is easily handled in industrial production thereof. More preferably, the specific surface area is 3 m$^2$/g to 30 m$^2$/g.

The conductive agent can improve the current-collecting performance of the negative electrode active material and can reduce the contact resistance with the current collector. Examples of the conductive agent include acetylene black, carbon black and graphite.

The binder can make it possible to bind the negative electrode active material and the conductive agent to each other. Examples of the binder include polytetrafluoroethylene (PTFE), polyvinylidene fluoride (PVdF), fluorine-based rubber, and styrene butadiene rubber.

The negative electrode active material, the conductive agent, and the binder in the negative electrode layer are preferably formulated in ratios of 70% to 96% by mass, 2% to 28% by mass, and 2% to 28% by mass, respectively. When the amount of the conductive agent is 2% by mass or more, the current collecting performance of the negative electrode layer is improved so that the high-current performance of the nonaqueous electrolyte battery can be improved. When the amount of the binder is 2% by mass or more, the binding performance between the negative electrode layer and the current collector is made high so that the cycle performance can be improved. On the other hand, the amounts of the conductive agent and the binder are preferably each 28% by mass or less in order to make the capacity of the battery high.

The negative electrode is produced by suspending, for example, the negative electrode active material, the conductive agent and the binder in a usual solvent to prepare a slurry, by applying the slurry to the surface of the current collector, and by drying the slurry, which is then pressed. Alternatively, the negative electrode may also be produced by forming a pellet containing the active material, the conductive agent and the binder to produce a negative electrode layer, which is then formed on the current collector.

3) Positive Electrode

The positive electrode can include a current collector, and a positive electrode layer formed on one or both surfaces of the current collector.

The current collector is preferably an aluminum foil, or an aluminum alloy foil containing elements such as Mg, Ti, Zn, Mn, Fe, Cu, and Si.

The positive electrode layer can contain a positive electrode active material, a conductive agent, and a binder.

For example, an oxide and a polymer or the like can be used as the positive electrode active material.

Examples of the oxide include manganese dioxide (MnO$_2$), iron oxide, copper oxide and nickel oxide in each of which lithium is adsorbed, a lithium manganese composite oxide (such as $Li_xMn_2O_4$ or $Li_xMnO_2$), a lithium nickel composite oxide (such as $Li_x:NiO_2$), a lithium cobalt composite oxide (such as $Li_xCoO_2$), a lithium nickel cobalt composite oxide (such as $LiNi_{1-y}Co_yO_2$), a lithium manganese cobalt composite oxide (such as $Li_xMn_yCo_{1-y}O_2$), a lithium manganese nickel composite oxide having a spinel structure (such as $Li_xMn_{2-y}Ni_yO_4$), a lithium phosphorus oxide having an olivine structure (such as $Li_xFePO_4$, $Li_xFe_{1-y}Mn_yPO_4$ and $Li_xCoPO_4$), iron sulfate ($Fe_2(SO_4)_3$), and vanadium oxide (such as $V_2O_5$), wherein x and y preferably satisfy the following: $0<x\leq1$ and $0\leq y\leq1$.

Examples of the polymer include a conductive polymer material such as polyaniline and polypyrrole, and a disulfide-based polymer material. Sulfur (S) and carbon fluoride may also be used as the active material.

Preferred examples of the positive electrode active material include a lithium manganese composite oxide ($Li_xMn_2O_4$), a lithium nickel composite oxide ($Li_xNiO_2$), a lithium cobalt composite oxide ($Li_xCoO_2$), a lithium nickel cobalt composite oxide ($Li_xNi_{1-y}Co_yO_2$), a lithium manganese nickel composite oxide having a spinel structure ($Li_xMn_{2-y}Ni_yO_4$), a lithium manganese cobalt composite oxide ($Li_xMn_yCo_{1-y}O_2$), and a lithium iron phosphate ($Li_xFePO_4$) each of which has a high positive electrode voltage, wherein x and y preferably satisfy the following: $0\leq x\leq1$ and $0\leq y\leq1$.

The more preferable examples of the positive electrode active material is a lithium cobalt composite oxide and a lithium manganese composite oxide. These active materials have high ion conductivity. Thus, in any combination with the above-mentioned negative electrode active material, the diffusion of lithium ions in the positive electrode active material scarcely becomes a rate-determining factor.

The conductive agent can improve the current-collecting performance of the active material, and can reduce the contact resistance between the active material and the current collector. Examples of the conductive agent include carbonaceous materials such as acetylene black, carbon black and graphite.

The binder can bind the active material with the conductive agent. Examples of the binder include polytetrafluoroethylene (PTFE), polyvinylidene fluoride (PVdF), and fluorine-based rubber.

The positive electrode active material, the conductive agent and the binder in the positive electrode layer are preferably formulated in ratios of 80% to 95% by mass, 3% to 18% by mass, and 2% to 17% by mass, respectively. When the amount of the conductive agent is 3% by mass or more, the above-mentioned advantageous effects can be exhibited. When the amount of the conductive agent is 18% by mass or less, the decomposition of the nonaqueous electrolyte on the surface of the conductive agent can be decreased when the battery is stored at high temperature. When the amount of the binder is 2% by mass or more, sufficient positive electrode strength can be obtained. When the amount of the binder is 17% by mass or less, the formulated amount of the binder, which is an insulating material in the positive electrode, is decreased, which decreases the internal resistance.

The positive electrode is produced by suspending, for example, the positive electrode active material, the conductive agent and the binder in a usual solvent to prepare a slurry, by applying the slurry to the surface of the current collector, and by drying the slurry, which is then pressed. Alternatively, the positive electrode may also be produced by forming a pellet containing the positive electrode active material, the conductive agent and the binder to produce a positive electrode layer, which is then formed on the current collector.

4) Nonaqueous Electrolyte

The nonaqueous electrolyte may be a liquid nonaqueous electrolyte prepared by dissolving an electrolyte in an organic solvent, or a gel-like nonaqueous electrolyte prepared by forming a composite of a liquid electrolyte and a polymer material.

The liquid nonaqueous electrolyte is preferably prepared by dissolving the electrolyte in an organic solvent in a concentration of 0.5 M or more and 2.5 M or less.

Examples of the electrolyte include lithium salts such as lithium perchlorate ($LiClO_4$), lithium hexafluorophosphate ($LiPF_6$), lithium tetrafluoroborate ($LiBF_4$), hexafluoro arsenic lithium ($LiAsF_6$), lithium trifluoromethasulfonate ($LiCF_3SO_3$), bistrifluoromethylsulfonylimide lithium [$LiN(CF_3SO_2)_2$], or mixtures of these compounds. The electrolyte is preferably an electrolyte which is resistant to oxidizing even at a high potential, and $LiPF_6$ is most preferable.

Examples of the organic solvent include cyclic carbonates such as propylene carbonate (PC), ethylene carbonate (EC) and vinylene carbonate; chain carbonates such as diethyl carbonate (DEC), dimethyl carbonate (DMC) and methylethyl carbonate (MEC); cyclic ethers such as tetrahydrofuran (THF), 2-methyltetrahydrofuran (2MeTHF) and dioxolan (DOX); chain ethers such as dimethoxyethane (DME) and diethoxyethane (DEE); γ-butyrolactone (GBL), acetonitrile (AN) and sulfolan (SL). These organic solvents may be used either singularly or in a form of a mixed solvent.

Examples of the polymer material include polyvinylidene fluoride (PVdF), polyacrylonitrile (PAN) and polyethylene oxide (PEO).

The organic solvent is preferably a mixed solvent made of at least two selected from the group consisting of propylene carbonate (PC), ethylene carbonate (EC) and diethyl carbonate (DEC), or a mixed solvent containing γ-butyrolactone (GBL). By use of the mixed solvent, a nonaqueous electrolyte battery having an excellent high-temperature property can be obtained.

5) Separator

The separator may be formed of, for example, a porous film containing polyethylene, polypropylene, cellulose or polyvinylidene fluoride (PVdF), or a synthetic resin nonwoven fabric. A preferable porous film is formed from polyethylene or polypropylene, each of which melts at a fixed temperature, making it possible to shut off current and can, therefore, improve safety.

6) Negative Electrode Terminal

The negative electrode terminal may be made of, for example, a material having electrical stability and electroconductivity in a potential range from 1 V to 3 V relative to metallic lithium ions. Specific examples thereof include aluminum, and an aluminum alloy containing elements such as Mg, Ti, Zn, Mn, Fe, Cu, and Si. The negative electrode terminal is preferably made of the same material as that of the negative electrode current collector to reduce the contact resistance with the negative electrode current collector.

7) Positive Electrode Terminal

The positive electrode terminal may be made of, for example, a material having electrical stability and electroconductivity in a potential range from 3 to 4.25 V relative to metallic lithium ions. Specific examples thereof include aluminum, and an aluminum alloy containing elements such as Mg, Ti, Zn, Mn, Fe, Cu, and Si. The positive electrode terminal is preferably made of the same material as that of the positive electrode current collector to reduce the contact resistance with the positive electrode current collector.

Next, an example of the nonaqueous electrolyte battery according to the third embodiment will be described with reference to the drawings.

First, a flat type nonaqueous electrolyte battery which is an example of the nonaqueous electrolyte battery according to the first embodiment will be described with reference to FIGS. 5 and 6.

FIG. 5 is a sectional schematic view of a flat type nonaqueous electrolyte secondary battery of an example according to the first embodiment. FIG. 6 is an enlarged sectional view of a region A of FIG. 5.

A nonaqueous electrolyte battery 100 shown in FIGS. 5 and 6 includes a flat type coil electrode group 1.

The flat type coiled electrode group 1 includes a negative electrode 3, a separator 4, and a positive electrode 5 as shown in FIG. 5. The negative electrode 3, the separator 4, and the positive electrode 5 are arranged in a state where the separator 4 is sandwiched between the negative electrode 3 and the positive electrode 5. The flat type coiled electrode group 1 can be formed by spirally coiling a laminated product formed by laminating the negative electrode 3, the separator 4, and the positive electrode 5 so that the separator 4 is sandwiched between the negative electrode 3 and the positive electrode 5 in a state where the negative electrode 3 is provided outside as shown in FIG. 6, and by subjecting the coiled product to press molding.

The negative electrode 3 includes a negative electrode current collector 3a and a negative electrode layer 3b. The outermost negative electrode 3 has a structure in which as shown in FIG. 6, a negative electrode layer 3b is formed on only one of the surfaces of the negative electrode current collector 3a, the surface facing inward. Other negative electrodes 3 each have a structure in which a negative electrode layer 3b is formed on each surface of the negative electrode current collector 3a.

In the positive electrode 5, a positive electrode layer 5b is formed on each surface of a positive electrode current collector 5a.

As shown in FIG. 5, a negative electrode terminal 6 is connected to the negative electrode current collector 3a of the outermost negative electrode 3 and a positive electrode terminal 7 is connected to the positive electrode current collector 5a of the inside positive electrode 5 in the vicinity of the outer peripheral end of the coiled electrode group 1.

The coiled electrode group 1 is accommodated in a baggy container 2 made of a laminated film obtained by sandwiching a metal layer between two resin layers.

The negative electrode terminal 6 and the positive electrode terminal 7 are externally extended from an opening part of the baggy container 2. For example, a liquid nonaqueous electrolyte is, for example, injected from the opening part of the baggy container 2, and is accommodated in the baggy container 2.

The opening part of the baggy container 2 is closed by heat sealing with the negative electrode terminal 6 and the positive electrode terminal 7 extended out of the opening part to thereby fully seal the coil electrode group 1 and the liquid nonaqueous electrolyte.

The negative electrode includes the active substance according to the first embodiment in the nonaqueous electrolyte battery according to the third embodiment. Therefore, the nonaqueous electrolyte battery can exhibit a high capacity, and an excellent high-current performance and cycle performance.

(Fourth Embodiment)

According to a fourth embodiment, there is provided a battery pack. The battery pack includes the nonaqueous electrolyte battery according to the third embodiment.

The battery pack according to the fourth embodiment includes at least one nonaqueous electrolyte battery (unit cell) according to the third embodiment. When a plurality of nonaqueous electrolyte batteries is included, each of the unit cells is electrically connected with one other in series or in parallel, or in the combination of series connection and parallel connection.

Subsequently, the battery pack according to the fourth embodiment will be described with reference to the drawings.

Figure 7:
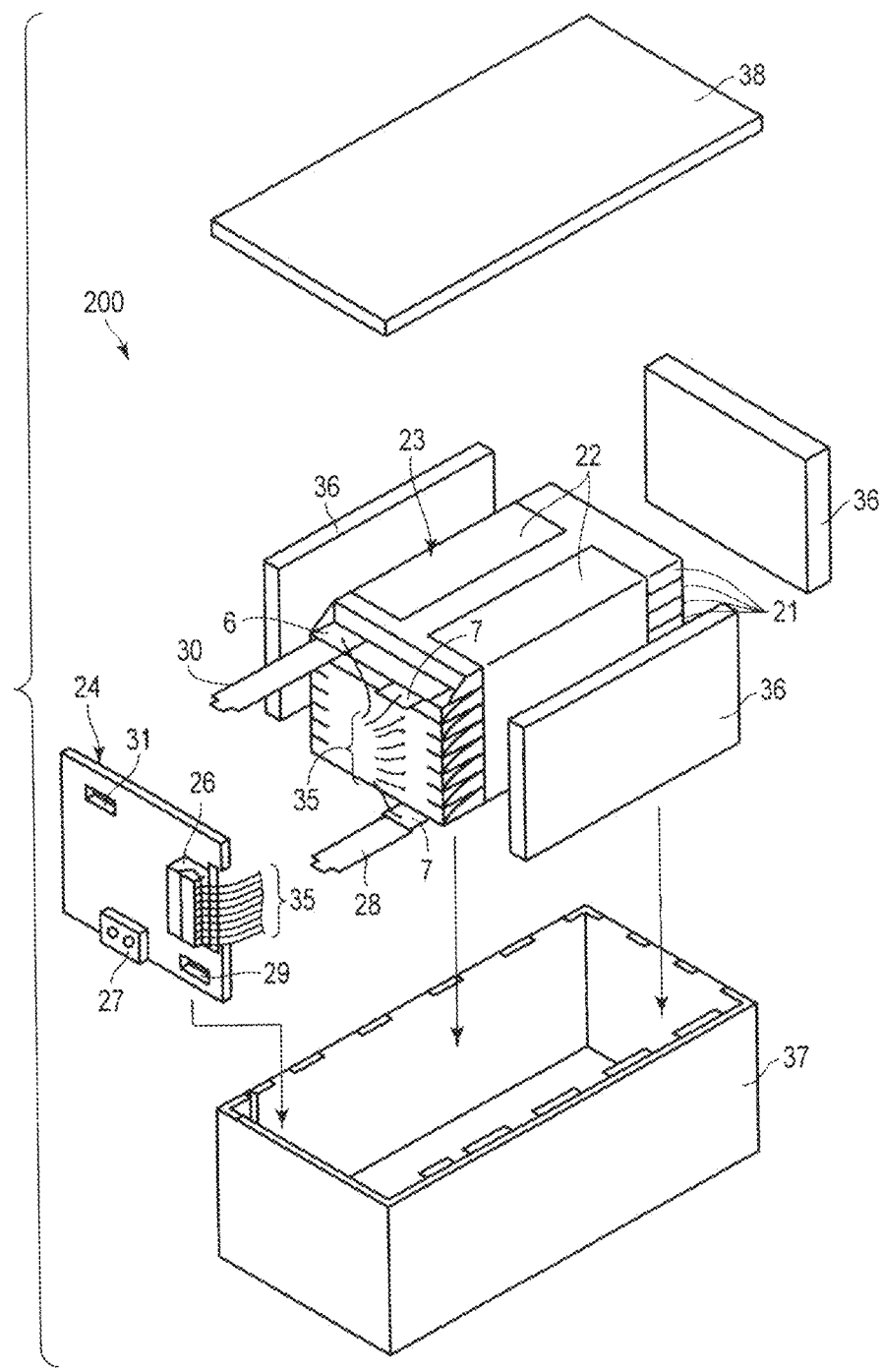
FIG. 7 is an exploded perspective view showing a battery pack of an example according to a fourth embodiment.
Figure 8:
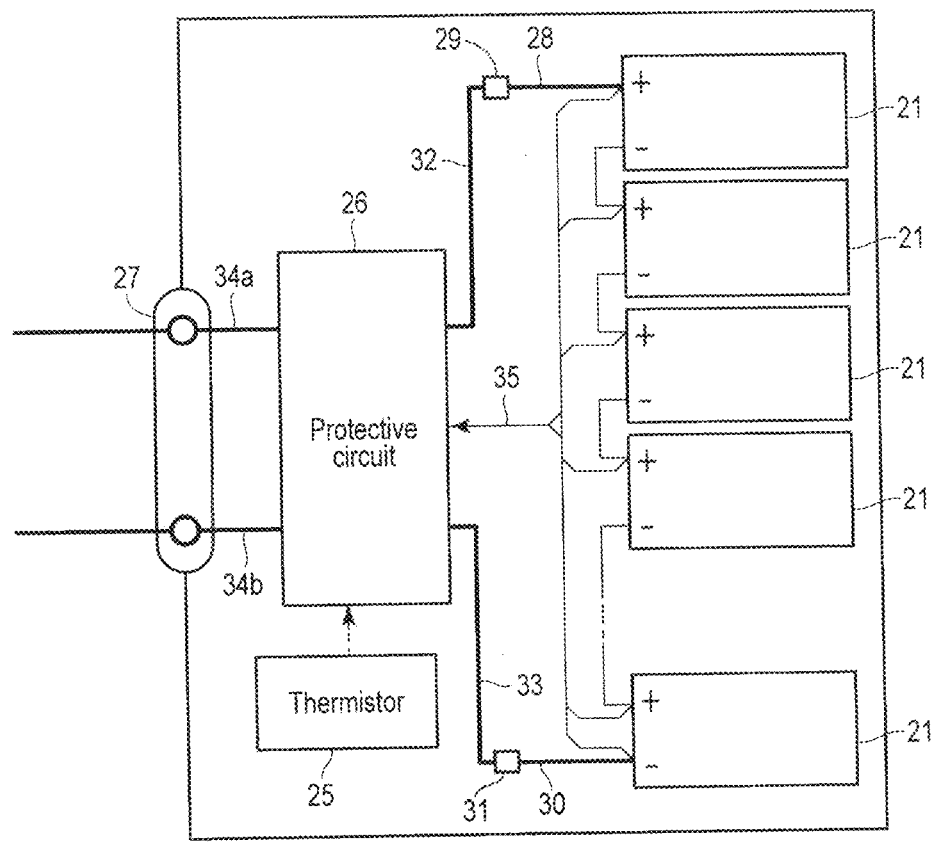
FIG. 8 is a block diagram showing an electrical circuit of the battery pack of FIG. 7.

FIG. 7 is an exploded perspective view of a battery pack according to a forth embodiment. FIG. 8 is a block diagram showing the electric circuit of the battery pack of FIG. 7.

A battery pack 200 shown in FIGS. 7 and 8 comprises a plurality of unit cells 21. Each of the unit cells 21 is the nonaqueous electrolyte battery 10 shown in FIGS. 5 and 6.

The plurality of unit cell 21 is stacked so that a negative electrode terminal 6 extended outside and a positive electrode terminal 7 are arranged in the same direction and fastening them with an adhesive tape 22, to constitute the battery module 23. The unit cells 21 are electrically connected in series with one another as shown in FIG. 8. The unit cells 21 electrically connected in series.

As shown in FIG. 7, a printed wiring board 24 is arranged opposed to the side plane of the unit cells 21 where the negative electrode terminal 6 and the positive electrode terminal 7 are extended. A thermistor 25, a protective circuit 26, and an energizing terminal 27 to an external instrument are mounted on the printed wiring board 24 as shown in FIG. 8. An electric insulating plate (not shown) is attached to the plane of the protective circuit board 24 facing the battery module 23 to avoid unnecessary connection of the wiring of the battery module 23.

As shown in FIG. 8, a positive electrode-side lead 28 is connected to the positive electrode terminal 7 located at the bottom layer of the battery module 23 and the distal end is inserted into a positive electrode-side connector 29 of the printed wiring board 24 so as to be electrically connected. A negative electrode-side lead 30 is connected to the negative electrode terminal 6 located at the top layer of the battery module 23 and the distal end is inserted into a negative electrode-side connector 31 of the printed wiring board 24 so as to be electrically connected. The connectors 29 and 31 are connected to the protective circuit 26 through wirings 32 and 33 formed in the printed wiring board 24, respectively.

The thermistor 25 is used to detect the temperature of the unit cells 21. The detection signal is sent to the protective circuit 26. The protective circuit 26 can shut down a plus-side wiring 34a and a minus-side wiring 34b between the protective circuit 26 and the energizing terminal 27 to an external instrument under a predetermined condition. The predetermined condition as an example is the case when the signal indicating the temperature of the unit cell 21 becomes more than a predetermined temperature is sent from the thermistor 25. Further, the predetermined condition as another example is the case when the over-charge, over-discharge, and over-current of the unit cells 21 are detected. The detection of the over-charge may be performed on each of the unit cells 21 or the whole of the battery module 23. When the over-charge of each of the unit cells 21 is detected, the voltage of each of the cell units may be detected or the potential of the positive electrode or the negative electrode may be detected. In the case of the latter, a lithium electrode to be used as a reference electrode is inserted into each of the unit cells 21. In the case of the battery pack 200 shown in FIGS. 7 and 8, wiring 35 for voltage detection is connected to each of the unit cells 21 and detection signals are sent to the protective circuit 26 through the wirings 35.

As shown in FIG. 7, protective sheets 36 comprised of rubber or resin are arranged on three side surfaces of the battery module 23 except the side surface from which the positive electrode terminal 7 and the negative electrode terminal 6 are protruded.

The battery module 23 is housed in a housing container 37 together with each of the protective sheets 36 and the printed wiring board 24. That is, the protective sheets 36 are arranged on both internal surfaces in a long side direction of the housing container 37 and on one of the internal surface at the opposite side in a short side direction. The printed wiring board 24 is arranged on the other internal surface in a short side direction. The battery module 23 is located in a space surrounded by the protective sheets 36 and the printed wiring board 24. A lid 38 is attached to the upper surface of the housing container 37.

In order to fix the battery module 23, a heat-shrinkable tape may be used in place of the adhesive tape 22. In this case, the battery module is bound by placing the protective sheets on the both sides of the battery module, winding a heat-shrinkable tape around such, and thermally shrinking the heat-shrinkable tape.

In FIGS. 7 and 8, the form in which the unit cells 21 are connected in series is shown. However, in the fourth embodiment, in order to increase the capacity, the cells may be connected in parallel. Alternatively, the battery pack according to the fourth embodiment may include the cells 21 connected to each other by combining series connection and parallel connection. Furthermore, a plurality of assembled battery packs can be connected in series or in parallel.

Also, although the battery pack shown in FIGS. 7 and 8 includes the plurality of unit cells 21, the battery pack according to the fourth embodiment may be one including one unit cell 21.

The form of the battery pack according to the fourth embodiment is appropriately changed according to the use. The battery pack according to the fourth embodiment is used suitably for the application which requires the excellent cycle characteristics when a high current is taken out. It is used specifically as a power source for digital cameras, for vehicles such as two- or four-wheel hybrid electric vehicles, for two- or four-wheel electric vehicles, and for assisted bicycles. Particularly, it is suitably used as a battery for automobile use.

The battery pack according to the fourth embodiment can exhibit a high capacity, an excellent high-current performance, and an excellent cycle performance, because the battery pack includes the nonaqueous electrolyte battery according to a third embodiment.

(Fifth Embodiment)

An automobile according to a fifth embodiment includes the battery pack according to a fourth embodiment. Examples of the vehicle referred to herein include hybrid electric two- to four-wheeled vehicles, electric two- to four-wheeled vehicles, and assisting bicycles.

Examples of the fifth embodiment include a hybrid type vehicle using a running power source which is produced by combining an internal combustion engine and an electromotor drivable by a battery. The driving power for any vehicle is required to be widely variable both in terms of rotational speed and torque depending on the driving condition. In general, the torque and the rotational speed which exhibit an ideal energy efficiency are restricted in internal combustion engines. Thus, under other driving conditions, the energy efficiency is lowered. The hybrid type vehicle has a characteristic that its internal combustion engine is driven under optimum conditions to generate electric power and further its wheels are driven by a highly efficient electromotor, or the dynamic power of its internal combustion engine and that of its electromotor are combined with each other to drive the wheels, whereby the energy efficiency of the whole of the vehicle can be improved. When the speed of the vehicle decreases, the kinetic energy of the vehicle is converted to electric power. Thus, the fuel economy thereof can be greatly increased from that of ordinary vehicles drivable by their internal combustion engine alone.

Hybrid vehicles can be roughly classified into three types in accordance with the type of the combination of internal combustion engine and electromotor.

A first hybrid vehicle is a hybrid vehicle which is generally called a series hybrid vehicle. In such a hybrid vehicle, all of the dynamic power of an internal combustion engine is once converted to electric power through a power source. This electric power is stored in a battery pack through an inverter. As the battery pack, the battery pack according to the fourth embodiment can be used. The electric power of the battery pack is supplied through the inverter to an electromotor. The electromotor drives wheels. In this system, an electromotor is hybridized with an electric vehicle. Its internal combustion engine can be driven under a high efficiency condition, and further, kinetic energy can be converted into electric power. However, as the wheels are only driven by the electromotor, a high-power electromotor is required. The battery pack is required to have a relatively large capacity. The nominal capacity of the battery pack is desirably in the range of 5 to 50 Ah. The capacity is more preferably in the range of 10 to 20 Ah. The rated capacity referred to herein means the capacity of the battery pack when the pack is discharged at a rate of 0.2 C.

A second hybrid vehicle is a hybrid vehicle called a parallel hybrid vehicle. Such a hybrid vehicle has an electromotor which functions also as a power source. An internal combustion engine mainly drives wheels. As the case may be, a part of the dynamic force thereof is converted to an electric power through the electromotor. By use of the electric power, a battery pack is charged. At the time of the start or acceleration of the vehicle, during which a large load is applied to the internal combustion engine, a driving force is supplemented by the electromotor. The base of the vehicle is an ordinary vehicle. In a system of the vehicle, a variation in the load onto the internal combustion engine can be made small to attain a high efficiency. The conversion of kinetic energy to electric power is also carried out by the system. The wheels are driven mainly by the internal combustion engine, so that the output power of the electromotor can be decided optionally, depending on the percentage of assistance required. Thus, the system can be constructed with a relatively small electromotor and battery pack. The rated capacity of the battery pack may be in the range of 1 to 20 Ah. The rated capacity is more preferably in the range of 5 to 10 Ah.

A third hybrid vehicle is a hybrid vehicle called a series parallel hybrid vehicle. This hybrid vehicle is one combining a series hybrid with a parallel hybrid. The hybrid vehicle includes a dynamic force dividing mechanism. This mechanism divides the output power of an internal combustion engine into a power for generating electric power and a power for driving wheels. The hybrid vehicle makes it possible to control a load on the engine more finely than the parallel type to make the energy efficiency higher.

The rated capacity of the battery pack is desirably in the range of 1 to 20 Ah. The rate capacity is more preferably in the range of 5 to 10 Ah.

The nominal voltage of the battery pack mounted on the three hybrid vehicles described above is desirably in the range of 200 to 600 V.

Figure 9:
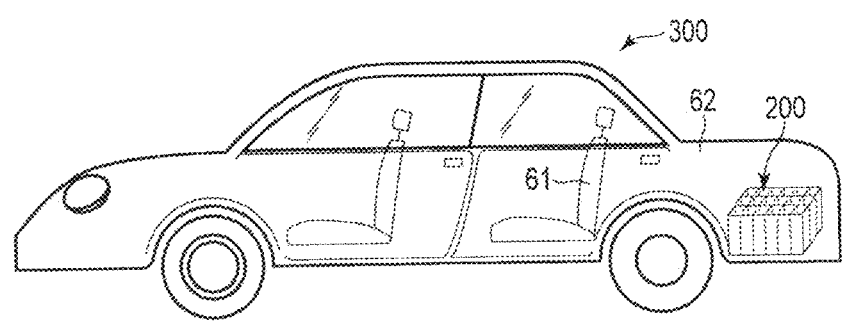
FIG. 9 is a sectional view which schematically shows the construction of a vehicle according to the fifth embodiment of the present invention and FIG. 10 is an X-ray diffraction pattern of a niobium composite oxide ($TiNb_2O_7$) in Example 1.

In general, the battery pack is preferably arranged in a space which is not easily affected by a change in the temperature of the outside air and is not easily affected by physical impact upon a vehicle collision. For example, in a sedan type vehicle 300 as shown in FIG. 9, the battery pack 200 may be arranged in a trunk room 62 behind a back sheet 61. The battery pack 200 may be arranged under or behind the back sheet 61. When the mass of the battery is large, the battery 200 is preferably arranged under the back sheet 61 or below the floor in order to lower the center of gravity of the entire vehicle 300.

Since the vehicle according to the fifth embodiment includes the battery pack according to the fourth embodiment, the vehicle can exhibit a high capacity, and an excellent high-current performance and cycle performance.

EXAMPLES

Hereinafter, Examples will be described. However, the present invention is not limited to the Examples described below without departing from the gist of the invention.

Example 1-1

In Example 1-1, a beaker cell was produced in the following procedure. In addition to that, beaker cells of Comparative Examples 1 to 4 were also produced in the following procedure.

<Preparation of Samples A1, B1, C1, D1, and E1>

Titanium dioxide ($TiO_2$) having an anatase structure and niobium pentoxide ($Nb_2O_5$) were mixed, and the mixture was sintered at 1100° C. for 24 hours to synthesize a niobium composite oxide having a composition formula $TiNb_2O_7$ (sample A1).

The obtained substance was identified to be the niobium composite oxide represented by the composition formula $TiNb_2O_7$ by a wide-angle X-ray diffraction method described below.

Next, 150 g of the niobium composite oxide having the composition formula $TiNb_2O_7$ (sample A1) and 5 g of polyethylene glycol were added to 150 g of pure water, and grinding and dispersing processing are carried out for 12 hours by ball milling using zirconia beads having a diameter of 5 mmφ, whereby a uniform slurry was prepared. Then, the slurry was sprayed in an air atmosphere of 180° C. and dried to thereby obtain a granulated body (secondary particles) (sample B1) which contained primary particles having an average particle diameter of about 0.6 μm. The granulated body had an average particle diameter of 10 μm. The obtained granulated body was sintered for 3 hours at 900° C. under an air atmosphere, whereby a sample C1 was obtained.

Then, 100 g of the sample C1, 3 g of maltose, and 100 g of pure water were put into a beaker, and mixed. The mixture was sufficiently dispersed with a stirrer using a rotor, and then dried by evaporation to thereby uniformly coat an organic material on the sample. Then, sintering (carbonization heat treatment) was carried out in an inert atmosphere in an argon air current at 700° C. for 1 hour to thereby carbonize the organic material. Thus, a sample D1 as an active substance was obtained.

The sample B1 was sintered in an inert atmosphere in an argon air current at 900° C. for 3 hours to obtain a sample E1.

<Wide-angle X-ray Diffraction Method>

Figure 10:
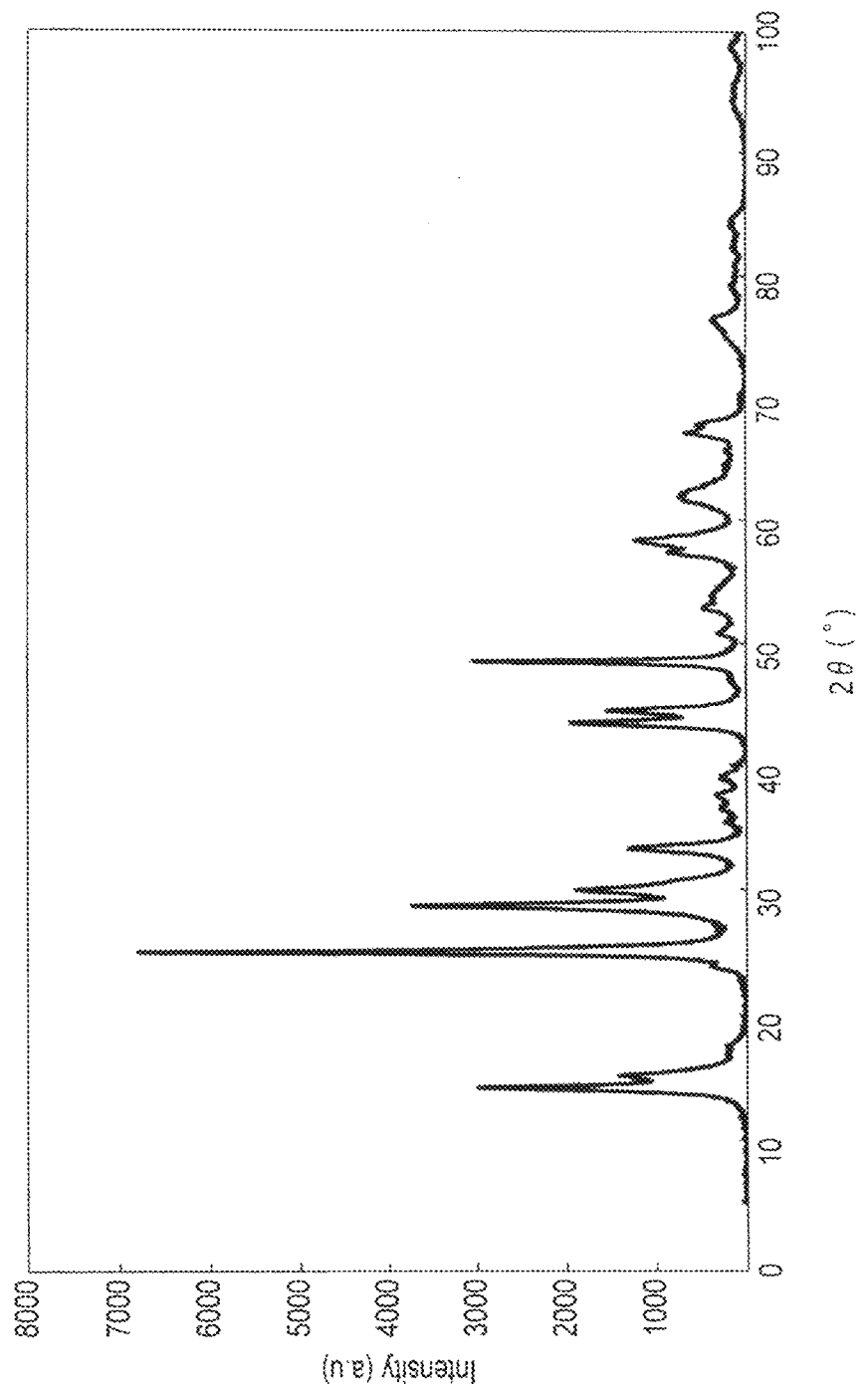

The niobium composite oxide as the sample A1 was filled into a standard glass holder having a diameter of 25 mm, and then the niobium composite oxide was measured by a wide angle X-ray diffraction method. As a result, an X-ray diffraction pattern shown in FIG. 10 was obtained. From this diffraction pattern, it was identified that a main substance constituting the obtained niobium composite oxide was a monoclinic niobium composite oxide (space group C2/m) represented by a composition formula $TiNb_2O_7$ belonging to 39-1407 according to JCPDS (Joint Committee on Powder Diffraction Standards). An apparatus and conditions used for the measurement were as follows:

(1) X-ray generator manufactured by Rigaku Corp., RU-200R (rotating target type)
X-ray source: CuKα ray
Use of curved crystal monochromator (graphite)
Power: 50 kV, 200 mA
(2) Goniometer manufactured by Rigaku Corp., 2155S2 type
Slit system: 1 degree-1 degree-0.15 mm-0.45 mm
Detector: Scintillation counter
(3) Counting recording apparatus manufactured by Rigaku Corp., RINT1400 type
(4) Scanning manner: 2θ/θ continuous scanning
(5) Qualitative analysis
Measuring range (2): 5 to 100 degrees
Scanning speed 2 degrees/minute
Step width (2θ): 0.02 degree <Production of Electrode>

By mass, 90% of the sample A1 powder, 5% of acetylene black used as a conductive agent, and 5% of polyvinylidene fluoride (PVdF) were added to N-methylpyrrolidone (NMP) and mixed to prepare a slurry. This slurry was applied to each surface of a current collector made of an aluminum foil having a thickness of 12 μm and dried. Then, the dried coating layer was pressed to obtain an electrode containing the sample A1 and having an electrode density of 2.8 g/cm³.

An electrode containing the sample B1, an electrode containing the sample C1, an electrode containing the sample D1, and an electrode containing the sample E1 were respectively produced by using the powders of the samples B1, C1, D1, and E1 in the same procedure as that of the production of the electrode containing the sample A1.

<Preparation of Liquid Nonaqueous Electrolyte>

Ethylene carbonate (EC) and diethyl carbonate (DEC) were mixed in a ratio by volume of 1:2 to make a mixed solvent. $LiPF_6$, which was an electrolyte, was dissolved in a concentration of 1 M in this mixed solvent to obtain a liquid nonaqueous electrolyte.

<Production of Beaker Cell>

A beaker cell was produced using the electrode containing the sample D1 as the working electrode and lithium metals as the counter electrode and reference electrode, and the aforementioned liquid nonaqueous electrolyte was injected into the beaker cell to complete a beaker cell of Example 1-1.

Beaker cells of Comparative Examples 1 to 4 were respectively completed by using the electrode containing the sample A1, the electrode containing the sample B1, the electrode containing the sample C1, and the electrode containing the sample E1 in the same procedure as that of the production of the beaker cell of Example 1-1.

<Measurement of Performances of Battery>

The beaker cells of Example 1-1 and Comparative Examples 1 to 4 were subjected to charge and discharge cycle 100 times. In this charge and discharge cycle, the beaker cells were subjected to constant current-constant voltage discharge at 1 C and 1 V for 3 hours under an environment of 25° C. (lithium insertion), and then subjected to a 1 C constant current charge (lithium release) until the voltage of the cell reached to 3 V. The ratio of the capacity in the 100th cycle to the initial capacity was calculated as a capacity retention ratio (%). The results are shown in the following Table 1.

<Measurement of Powder Strength>

The powder strengths (compression fracture strengths) of the samples A1, B1, C1, D1, and E1 were measured by the method shown above. The results are shown in the following Table 1.

<Specific Surface Area>

The specific surface areas of the samples A1, B1, C1, D1, and E1 were measured by the method shown above. The results are shown in the following Table 1.

<Primary Particle Diameter and Secondary Particle Diameter>

The primary particle diameters and secondary particle diameters of the samples A1, B1, C1, D1, and E1 were measured in the procedure described above. The results are shown in the following Table 1.

<Carbon Content>

The carbon content of the samples A1, B1, C1, D1, and E1 was measured by infrared absorption method. The results are shown in the following Table 1.

The distribution state of carbon was identified by subjecting aggregated particles to cross-sectional SEM-EDX analysis to obtain a carbon mapping image.

From the results shown in Table 1, it is found that the beaker cell of Example 1-1 using the sample D1 containing carbon has a more excellent capacity and capacity retention ratio than those of the beaker cells of Comparative Examples 1 to 3 using the samples A1, B1, and C1 containing no carbon.

From the results shown in Table 1, it is also found that the beaker cell of Example 1-1 using the sample D1 having a powder strength of 44 MPa has a more excellent capacity and capacity retention ratio than those of the beaker cell of Comparative Example 4 using the sample E1 having a powder strength of 3 MPa.

The presence state of carbon in the sample D1 and the sample E1 was confirmed. As a result, it was found that carbon existed almost equally in the sample E1, but a carbon concentration on a surface side was higher than that in a central part in the sample D1. This is considered to be because unnecessary carbon which does not participate in the construction of a conductive path between the aggregated particles can be decreased by subjecting the aggregated particles sintered in the atmosphere to a carbonization treatment, and the phenomenon also contributes to an improvement in the powder strength.

Examples 1-2 to 1-7

In Example 1-2 to 1-7, samples D1-2 to D1-7 as active substances were prepared by the same method as that of Example 1-1 except that the additive amount of maltose was changed as shown in Table 2.

Beaker cells of Examples 1-2 to 1-7 were produced in the same procedure as the above-mentioned procedure by using the obtained samples D1-2 to D1-7.

The performances of the battery for the beaker cells of Examples 1-2 to 1-7 were measured in the above-mentioned procedure. The results are shown in the following Table 2.

Furthermore, the primary particle diameters, secondary particle diameters, the content carbon, specific surface areas, and powder strengths of the samples D1-2 to D1-7 were measured in the above-mentioned procedure. The results are shown in the following Table 2.

TABLE 1

|  |  | Carbon, content [% by mass] | Primary Particle Diameter [μm] | Secondary Particle Diameter [μm] | Specific Surface Area [m²/g] | Powder Strength [MPa] | Capacity [mAh/g] | Capacity Retention Ratio [%] |
|---|---|---|---|---|---|---|---|---|
| Comparative Example 1 | Sample A1 | 0 | 15 | 15 | 0.8 | 100 | 157 | Less than 10 |
| Comparative Example 2 | Sample B1 | 0 | 0.6 | 12 | 10 | 3 | 210 | Less than 10 |
| Comparative Example 3 | Sample C1 | 0 | 0.6 | 12 | 8 | 38 | 250 | Less than 10 |
| Example 1-1 | Sample D1 | 2.2 | 0.6 | 12 | 14 | 44 | 278 | 85 |
| Comparative Example 4 | Sample E1 | 2.3 | 0.6 | 12 | 12 | 3 | 250 | 18 |

TABLE 2

|  |  | Additive Amount of Maltose [g] | Carbon content [% by mass] | Primary Particle Diameter [μm] | Secondary Particle Diameter [μm] | Specific Surface Area [m²/g] | Powder Strength [MPa] | Capacity [mAh/g] | Capacity Retention Ratio [%] |
|---|---|---|---|---|---|---|---|---|---|
| Example 1-1 | Sample D1 | 3 | 2.2 | 0.6 | 14 | 14 | 44 | 278 | 85 |
| Example 1-2 | Sample D1-2 | 0.04 | 0.03 | 0.7 | 14 | 9 | 66 | 284 | 68 |
| Example 1-3 | Sample D1-3 | 0.12 | 0.1 | 0.6 | 14 | 10 | 58 | 282 | 72 |
| Example 1-4 | Sample D1-4 | 1.3 | 1.0 | 0.6 | 14 | 12 | 50 | 280 | 85 |
| Example 1-5 | Sample D1-5 | 5 | 3.1 | 0.6 | 14 | 15 | 42 | 275 | 87 |
| Example 1-6 | Sample D1-6 | 7.5 | 5.1 | 0.6 | 14 | 18 | 36 | 264 | 87 |
| Example 1-7 | Sample D1-7 | 15 | 10.2 | 0.6 | 14 | 23 | 28 | 258 | 90 |

From the results shown in Table 2, it is found that the capacity retention ratio is increased with the increase in the amount of carbon, but the capacity is decreased. This is considered to be because carbon does not contribute to charge and discharge, which causes the decrease in the capacity with the increase in the amount of carbon. Based on the above results and a life, the amount of carbon is preferably 1 to 3.1%.

Examples 2 to 6

In Examples 2 to 6, samples D2 to D6 as active substances were prepared by the same method as that of Example 1-1 except that a heat treatment temperature of the sample B1 was changed as shown in the following Table 3.

Niobium composite oxides obtained in Examples 2 to 6 were measured by a wide-angle X-ray diffraction method in the same manner as in Example 1. It was confirmed that the niobium composite oxide was a monoclinic niobium composite oxide represented by the general formula $Li_xM_{(1-y)}Nb_yNb_2O_{(7+\delta)}$ and represented by a composition formula $TiNb_2O_7$ belonging to JCPDS card #39-1407.

Beaker cells of Examples 2 to 6 were produced in the procedure described above by using the obtained samples D2 to D6.

The performances of the battery for the beaker cells of Examples 2 to 6 were measured in the procedure described above. The results are shown in the following Table 3.

The primary particle diameters, secondary particle diameters, the content of carbon, specific surface areas, and powder strengths of the samples D2 to D6 were measured in the procedure described above. The results are shown in the following Table 3.

capacity retention ratio than those of the beaker cell of Comparative Example 4 containing carbon and having a powder strength of less than 10 MPa.

Comparative Examples 5 and 6

In Comparative Examples 5 and 6, samples D5R and D6R as active substances were prepared by the same method as that of Example 1-1 except that a carbonization heat treatment temperature was changed as shown in the following Table 4.

Beaker cells of Comparative Examples 5 and 6 were produced in the procedure described above by using the obtained samples D5R and D6R.

The performances of the battery for the beaker cells of Comparative Examples 5 and 6 were measured in the procedure described above. The results are shown together with the results of Example 1-1 in the following Table 4.

The primary particle diameters, secondary particle diameters, the content of carbon, specific surface areas, and powder strengths of the samples D5R and D6R were measured in the procedure described above. The results are shown together with the results of Example 1-1 in the following Table 4.

The samples D5R and D6R were measured by a wide-angle X-ray diffraction method in the same manner as in Example 1. As the result, it was confirmed that the samples D5R and D6R were monoclinic niobium composite oxides represented by the general formula $Li_xM_{(1-y)}Nb_yNb_2O_{(7+\delta)}$, and represented by a composition formula $TiNb_2O_7$ belonging to JCPDS card #39-1407. The presence of a difference phase was clearly identified in the sample D6R contained in

TABLE 3

|  |  | Temperature of Heat Treatment [° C.] | Carbon content [% by mass] | Primary Particle Diameter [μm] | Secondary Particle Diameter [μm] | Specific Surface Area [m²/g] | Powder Strength [MPa] | Capacity [mAh/g] | Capacity Retention Ratio [%] |
|---|---|---|---|---|---|---|---|---|---|
| Example 2 | Sample D2 | 1100 | 1.8 | 1.2 | 11 | 6 | 79 | 250 | 70 |
| Example 3 | Sample D3 | 1000 | 2.0 | 0.8 | 13 | 9 | 70 | 275 | 78 |
| Example 1-1 | Sample D1 | 900 | 2.2 | 0.6 | 14 | 14 | 44 | 278 | 85 |
| Example 5 | Sample D5 | 800 | 2.2 | 0.6 | 14 | 18 | 28 | 275 | 84 |
| Example 6 | Sample D6 | 700 | 2.3 | 0.6 | 14 | 21 | 10 | 267 | 80 |

From the results shown in Tables 1 and 3, it is found that the beaker cells of Examples 2 to 6 using samples D2 to D6 each of which contains carbon and hays a powder strength of 10 MPa or more have a more excellent capacity and the beaker cell of Comparative Example 6. This is considered to be because the surface of the niobium composite oxide is reduced since a carbonization heat treatment is performed at a high temperature.

TABLE 4

| | | Temperature of Carbonizing Heat Treatment [° C.] | Carbon content [% by mass] | Primary Particle Diameter [μm] | Secondary Particle Diameter [μm] | Specific Surface Area [m$^2$/g] | Powder Strength [MPa] | Capacity [mAh/g] | Capacity Retention Ratio [%] |
|---|---|---|---|---|---|---|---|---|---|
| Comparative Example 5 | Sample DR5 | 500 | 2.4 | 0.6 | 14 | 28 | 3 | 260 | 28 |
| Comparative Example 6 | Sample DR6 | 1100 | 0.9 | 0.8 | 14 | 9 | 8 | 215 | Less than 10 |

From the results shown in Table 4, it is found that the samples DR5 and DR6 have a powder strength of less than 10 MPa. From the results shown in Tables 3 and 4, it is found that the beaker cell of Example 1-1 using a sample D1-1 having a powder strength of 10 MPa or more and the beaker cells of Examples 2 to 6 using the samples D2 to D6 having a powder strength of 10 MPa or more have a more excellent capacity retention ratio than those of the beaker cells of Comparative Examples 5 and 6 using the samples DR5 and DR6 having a powder strength of less than 10 MPa.

Examples 7 to 11

In Examples 7 to 11, samples D7 to D11 as active substances were prepared by the same method as that of Example 1-1 except that titanium dioxide (TiO$_2$) having an anatase structure, zirconium dioxide (ZrO$_2$), and niobium pentoxide (Nb$_2$O$_5$) were mixed, and the mixture was sintered at a temperature shown in the following Table 5 for 24 hours to synthesize niobium composite oxides (samples A7 to A11) having a composition formula Ti$_{0.9}$Zr$_{0.1}$Nb$_2$O$_7$.

The samples A7 to A11 were measured by a wide-angle X-ray diffraction method in the same manner as in Example 1. It was identified that the samples A7 to A11 were monoclinic niobium composite oxides represented by the general formula Li$_x$M$_{(1-y)}$Nb$_y$Nb$_2$O$_{(7+\delta)}$ and represented by a composition formula Ti$_{0.9}$Zr$_{0.1}$Nb$_2$O$_7$ belonging to JCPDS card #39-1407.

Beaker cells of Examples 7 to 11 were produced in the procedure described above by using the obtained samples D7 to D11.

The performances of the battery for the beaker cells of Examples 7 to 11 were measured in the procedure described above. The results are shown in the following Table 5.

The primary particle diameters, secondary particle diameters, the content of carbon, specific surface areas, and powder strengths of the samples D7 to D11 were measured in the procedure described above. The results are shown in the following Table 5.

From the results shown in Tables 1 and 5, it is found that the same results as those of Example 1-1 using the niobium composite oxide containing no zirconium are obtained also in Examples 7 to 11 using the niobium composite oxide containing zirconium.

Examples 12 to 17

In Examples 12 to 17, samples D12 to D17 as active substances were prepared by the same method as that of Example 1-1 except that P$_2$O$_5$ and/or B$_2$O$_3$ were/was mixed with titanium dioxide (TiO$_2$) having an anatase structure and niobium pentoxide (Nb$_2$O$_5$) in synthesis of a niobium composite oxide.

Beaker cells of Examples 12 to 17 were produced in the procedure described above by using the obtained samples D12 to D17.

The performances of the battery for the beaker cells of Examples 12 to 17 were measured in the procedure described above. The results are shown together with the results of Example 1-1 in the following Table 6.

The primary particle diameters, secondary particle diameters, the content of carbon, specific surface areas, and powder strengths of the samples D12 to D17 were measured in the procedure described above. The results are shown together with the results of Example 1-1 in the following Table 6.

Furthermore, the contents of phosphorus and boron in the samples D12 to D17 were measured by the ICP emission spectroscopy described above. The results are shown together with the results of Example 1-1 in the following Table 6.

TABLE 5

| | | Temperature of Heat Treatment [° C.] | Carbon content [% by mass] | Primary Particle Diameter [μm] | Secondary Particle Diameter [μm] | Specific Surface Area [m$^2$/g] | Powder Strength [MPa] | Capacity [mAh/g] | Capacity Retention Ratio [%] |
|---|---|---|---|---|---|---|---|---|---|
| Example 7 | Sample D7 | 1100 | 1.8 | 1.2 | 12 | 1 | 90 | 247 | 73 |
| Example 8 | Sample D8 | 1000 | 2.0 | 0.8 | 13 | 10 | 83 | 272 | 80 |
| Example 9 | Sample D9 | 900 | 2.2 | 0.6 | 14 | 14 | 50 | 275 | 83 |
| Example 10 | Sample D10 | 800 | 2.2 | 0.6 | 14 | 19 | 32 | 272 | 85 |
| Example 11 | Sample D11 | 700 | 2.3 | 0.6 | 14 | 23 | 18 | 265 | 80 |

TABLE 6

|  |  | Amount of (P, B) [% by mass] | Carbon content [% by mass] | Primary Particle Diameter [μm] | Secondary Particle Diameter [μm] | Specific Surface Area [m²/g] | Powder Strength [MPa] | Capacity [mAh/g] | Capacity Retention Ratio [%] |
| --- | --- | --- | --- | --- | --- | --- | --- | --- | --- |
| Example 1-1 | Sample D1 | (0, 0) | 2.2 | 0.6 | 12 | 14 | 44 | 278 | 85 |
| Example 12 | Sample D12 | (0.013, 0) | 2.2 | 0.6 | 12 | 14 | 58 | 280 | 86 |
| Example 13 | Sample D13 | (0.10, 0) | 2.2 | 0.6 | 12 | 13 | 62 | 282 | 90 |
| Example 14 | Sample D14 | (1.20, 0) | 2.2 | 0.6 | 12 | 12 | 70 | 278 | 90 |
| Example 15 | Sample D15 | (0, 0.012) | 2.2 | 0.6 | 12 | 14 | 50 | 278 | 88 |
| Example 16 | Sample D16 | (0, 0.11) | 2.2 | 0.6 | 12 | 13 | 55 | 278 | 90 |
| Example 17 | Sample D17 | (0, 1.22) | 2.2 | 0.6 | 12 | 12 | 60 | 275 | 90 |

From the results shown in Table 6, it is found that the samples D12 to D17 which contain phosphorus and/or boron have a higher powder strength than that of the sample D1-1 which does not contain phosphorus and boron, and as a result, the beaker cells of Examples 12 to 17 have a higher capacity retention ratio than that of the beaker cell of Example 1-1.

Example 18 and Comparative Examples 7 to 10

In Example 18, a beaker cell of Example 18 was produced in the following procedure. In addition to that, beaker cells of Comparative Examples 7 to 10 were also produced in the following procedure.

<Preparation of Samples A18, B18, C18, D18, and E18>

Niobium hydroxide (Nb(OH)$_5$) was sintered at 1100° C. for 24 hours to synthesize a niobium composite oxide M-Nb$_2$O$_5$ (sample A18). Herein, "M" in the formula means monoclinic.

It was identified that the sample A18 was a monoclinic niobium composite oxide (space group P12/m1) represented by the general formula Li$_x$M$_{(1-y)}$Nb$_y$Nb$_2$O$_{(7+\delta)}$ and belonging to JCPDS card #27-1313 by the wide-angle X-ray diffraction method described above.

Then, samples B18, C18, D18, and E18 were obtained by the same method as that of Example 1-1.

A beaker cell of Example 18 was produced in the same procedure as that of Example 1-1 by using the sample D18.

Each of beaker cells of Comparative Examples 7 to 10 was produced in the same procedure by using each of the samples A18, B18, C18, and E18, respectively.

The performances of the battery for the beaker cells of Example 18 and Comparative Examples 7 to 10 were measured in the procedure described above. The results are shown in the following Table 7.

The primary particle diameters, secondary particle diameters, the content of carbon, specific surface areas, and powder strengths of the samples A18, B18, C18, D18, and E18 were measured in the procedure described above. The results are shown in the following Table 7.

TABLE 7

|  |  | Carbon content [% by mass] | Primary Particle Diameter [μm] | Secondary Particle Diameter [μm] | Specific Surface Area [m²/g] | Powder Strength [MPa] | Capacity [mAh/g] | Capacity Retention Ratio [%] |
| --- | --- | --- | --- | --- | --- | --- | --- | --- |
| Comparative Example 7 | Sample A18 | 0 | 14 | 14 | 0.7 | 72 | 137 | Less than 10 |
| Comparative Example 8 | Sample B18 | 0 | 0.6 | 12 | 10 | 3 | 198 | Less than 10 |
| Comparative Example 9 | Sample C18 | 0 | 0.6 | 12 | 8 | 3 | 255 | Less than 10 |
| Example 18 | Sample D18 | 2.2 | 0.6 | 12 | 14 | 38 | 270 | 80 |
| Comparative Example 10 | Sample E18 | 1.8 | 0.6 | 12 | 8 | 3 | 207 | Less than 10 |

From the results shown in Tables 1 and 7, it is found that Example 18 using the monoclinic niobium composite oxide having the space group P12/m1 also provides the same results as those of Example 1 using the monoclinic niobium composite oxide having the space group C/2m.

The active substance according to at least one embodiment and Example described above contains the secondary particle which is constructed by the aggregated active materials of the niobium composite oxide and has a compression fracture strength of 10 MPa or more, and the carbon material phase formed on at least a part of the surface of the secondary particle. Therefore, the active substance can achieve the nonaqueous electrolyte battery having a high capacity, and an excellent high-current performance and cycle performance.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A negative electrode including an active substance, comprising:
    secondary particles each of which is constructed by aggregated primary particles of an active material, the primary particles of the active material comprising a niobium composite oxide represented by Li$_x$M$_{(1-y)}$ $Nb_yNb_2O_{(7+\delta)}$, wherein M is at least one selected from the group consisting of Ti and Zr, and x, y, and δ respectively satisfy $0 \leq x \leq 6$, $0 \leq y \leq 1$, and $-1 \leq \delta \leq 1$, the secondary particles having a compression fracture strength of 10 MPa or more and 200 MPa or less, an average particle diameter of the primary particles being in a range of 1 nm to 10 μm, and an average particle diameter of the secondary particles being in a range of 1 μm to 100 μm; and a carbon material phase formed on at least a part of a surface of each of the secondary particles, a carbon content in the active substance being in a range of 0.1% by mass to 10% by mass based on a mass of the active substance.

2. The negative electrode according to claim 1, wherein a carbon concentration in a central part of the active substance is lower than a carbon concentration in a surrounding part of the active substance.

3. The negative electrode according to claim 1, wherein
the niobium composite oxide comprises at least one further element selected from boron and phosphorus; and
a content of the further element is in a range of 0.03% by mass to 3% by mass.

4. The negative electrode according to claim 1, wherein a crystal structure of the niobium composite oxide belongs to a monoclinic system.

5. The negative electrode according to claim 1, wherein a crystal structure of the niobium composite oxide belongs to a space group C2/m or P12/m1.

6. The negative electrode according to claim 1, wherein the compression fracture strength is from 30 MPa to 200 MPa.

7. The negative electrode according to claim 1, wherein the carbon content in the active substance is in a range of 1% by mass to 3% by mass based on the mass of the active substance.

8. The negative electrode according to claim 1, wherein the average particle diameter of the secondary particles is in a range of 3 μm to 30 μm.

9. The negative electrode according to claim 1, wherein the average particle diameter of the primary particles is in a range of 10 nm to 1 μm.

10. The negative electrode according to claim 1, wherein the secondary particles have a specific surface area of 5 $m^2$/g to 50 $m^2$/g, the specific surface area being measured by the BET method.

11. An nonaqueous electrolyte battery comprising:
a positive electrode;
the negative electrode according to claim 1; and
a nonaqueous electrolyte.

12. A battery pack comprising the nonaqueous electrolyte battery according to claim 11.

13. An automobile comprising the battery pack according to claim 12.

14. A battery pack comprising a plurality of nonaqueous electrolyte batteries, each of the plurality of nonaqueous electrolyte batteries comprising: a positive electrode; the negative electrode according to claim 1; and a nonaqueous electrolyte, wherein
the plurality of nonaqueous electrolyte batteries are electrically connected to each other; and
the battery pack further comprises a protective circuit which can detect a voltage of each of the plurality of nonaqueous electrolyte batteries.

* * * * *